US010321457B2

(12) United States Patent
Ahn et al.

(10) Patent No.: US 10,321,457 B2
(45) Date of Patent: Jun. 11, 2019

(54) WIRELESS COMMUNICATION METHOD AND TERMINAL FOR MULTI-USER UPLINK TRANSMISSION

(71) Applicant: WILUS INSTITUTE OF STANDARDS AND TECHNOLOGY INC., Seoul (KR)

(72) Inventors: Woojin Ahn, Seoul (KR); Yongho Kim, Incheon (KR); Jinsam Kwak, Gyeonggi-do (KR); Juhyung Son, Gyeonggi-do (KR)

(73) Assignees: WILUS INSTITUTE OF STANDARDS AND TECHNOLOGY INC., Gyeonggi-Do (KR); SK TELECOM CO., LTD., Seoul (KR)

( * ) Notice: Subject to any disclaimer, the term of this patent is extended or adjusted under 35 U.S.C. 154(b) by 0 days.

(21) Appl. No.: 15/529,984

(22) PCT Filed: Nov. 27, 2015

(86) PCT No.: PCT/KR2015/012864
§ 371 (c)(1),
(2) Date: May 25, 2017

(87) PCT Pub. No.: WO2016/085296
PCT Pub. Date: Jun. 2, 2016

(65) Prior Publication Data
US 2017/0325223 A1 Nov. 9, 2017

(30) Foreign Application Priority Data

Nov. 28, 2014 (KR) .................. 10-2014-0168563
Jan. 8, 2015 (KR) .................. 10-2015-0002950
Mar. 11, 2015 (KR) .................. 10-2015-0033942

(51) Int. Cl.
*H04W 72/04* (2009.01)
*H04W 84/12* (2009.01)
*H04W 74/08* (2009.01)

(52) U.S. Cl.
CPC ....... *H04W 72/0446* (2013.01); *H04W 74/08* (2013.01); *H04W 84/12* (2013.01); *H04W 72/042* (2013.01)

(58) Field of Classification Search
CPC ........... H04W 72/0446; H04W 72/042; H04W 84/12; H04W 74/08
(Continued)

(56) References Cited

U.S. PATENT DOCUMENTS

2008/0232490 A1 9/2008 Gross et al.
2009/0232061 A1 9/2009 Rajamani et al.
(Continued)

OTHER PUBLICATIONS

International Search Report for PCT/KR2015/012864 dated Mar. 11, 2016 and its English translation from WIPO.
(Continued)

*Primary Examiner* — Faisal Choudhury
(74) *Attorney, Agent, or Firm* — Ladas & Parry, LLP

(57) ABSTRACT

Provided is a wireless communication terminal including a transceiver for transmitting/receiving a wireless signal and a processor for controlling an operation of the wireless communication terminal. The transceiver receives a first frame indicating information on a resource that a base wireless communication terminal allocates to a plurality of wireless communication terminals from the base wireless communication terminal, and transmits data to the base wireless communication terminal based on the first frame. The plurality of wireless communication terminals include the wireless communication terminal.

19 Claims, 19 Drawing Sheets

(58) Field of Classification Search
USPC .......................................................... 370/329
See application file for complete search history.

(56) References Cited

U.S. PATENT DOCUMENTS

| | | |
|---|---|---|
| 2010/0027490 A1 | 2/2010 | Mazet et al. |
| 2010/0220678 A1 | 9/2010 | Wentink |
| 2011/0044298 A1 | 2/2011 | Wentink et al. |
| 2015/0085797 A1* | 3/2015 | Ji ............................. H04J 3/16 |
| | | 370/329 |
| 2015/0358904 A1* | 12/2015 | Kwon ............... H04W 52/0206 |
| | | 370/252 |
| 2017/0006606 A1* | 1/2017 | Matsuo ............. H04W 72/0446 |
| 2017/0006609 A1* | 1/2017 | Adachi ............. H04W 72/0453 |
| 2017/0055279 A1* | 2/2017 | Janis .................... H04B 17/318 |
| 2017/0104565 A1* | 4/2017 | Seok ................... H04L 27/2602 |

OTHER PUBLICATIONS

Written Opinion of the International Searching Authority for PCT/KR2015/012864 dated Mar. 11, 2016 and its English machine translation by Google Translate.

\* cited by examiner

WIRELESS COMMUNICATION METHOD AND TERMINAL FOR MULTI-USER UPLINK TRANSMISSION

CROSS-REFERENCE TO RELATED APPLICATIONS

This application is the U.S. National Stage of International Patent Application No. PCT/KR2015/012864 filed on Nov. 27, 2015, which claims the priority to Korean Patent Application No. 10-2014-0168563 filed in the Korean Intellectual Property Office on Nov. 28, 2014, Korean Patent Application No. 10-2015-0002950 filed in the Korean Intellectual Property Office on Jan. 8, 2015, and Korean Patent Application No. 10-2015-0033942 filed in the Korean Intellectual Property Office on Mar. 11, 2015, the entire contents of which are incorporated herein by reference.

TECHNICAL FIELD

The present invention relates to a wireless communication method and a wireless communication terminal for setting a broadband link. Specifically, the present invention relates to a wireless communication method and a wireless communication terminal for increasing data communication efficiency by expanding a data transmission bandwidth of a terminal.

BACKGROUND ART

In recent years, with supply expansion of mobile apparatuses, a wireless LAN technology that can provide a rapid wireless Internet service to the mobile apparatuses has been significantly spotlighted. The wireless LAN technology allows mobile apparatuses including a smart phone, a smart pad, a laptop computer, a portable multimedia player, an embedded apparatus, and the like to wirelessly access the Internet in home or a company or a specific service providing area based on a wireless communication technology in a short range.

Institute of Electrical and Electronics Engineers (IEEE) 802.11 has commercialized or developed various technological standards since an initial wireless LAN technology is supported using frequencies of 2.4 GHz. First, the IEEE 802.11*b* supports a communication speed of a maximum of 11 Mbps while using frequencies of a 2.4 GHz band. IEEE 802.11a which is commercialized after the IEEE 802.11b uses frequencies of not the 2.4 GHz band but a 5 GHz band to reduce an influence by interference as compared with the frequencies of the 2.4 GHz band which are significantly congested and improves the communication speed up to a maximum of 54 Mbps by using an OFDM technology. However, the IEEE 802.11a has a disadvantage in that a communication distance is shorter than the IEEE 802.11b. In addition, IEEE 802.11g uses the frequencies of the 2.4 GHz band similarly to the IEEE 802.11b to implement the communication speed of a maximum of 54 Mbps and satisfies backward compatibility to significantly come into the spotlight and further, is superior to the IEEE 802.11a in terms of the communication distance.

Moreover, as a technology standard established to overcome a limitation of the communication speed which is pointed out as a weak point in a wireless LAN, IEEE 802.11n has been provided. The IEEE 802.11n aims at increasing the speed and reliability of a network and extending an operating distance of a wireless network. In more detail, the IEEE 802.11n supports a high throughput (HT) in which a data processing speed is a maximum of 540 Mbps or more and further, is based on a multiple inputs and multiple outputs (MIMO) technology in which multiple antennas are used at both sides of a transmitting unit and a receiving unit in order to minimize a transmission error and optimize a data speed. Further, the standard can use a coding scheme that transmits multiple copies which overlap with each other in order to increase data reliability.

As the supply of the wireless LAN is activated and further, applications using the wireless LAN are diversified, the need for new wireless LAN systems for supporting a higher throughput (very high throughput (VHT)) than the data processing speed supported by the IEEE 802.11n has come into the spotlight. Among them, IEEE 802.11ac supports a wide bandwidth (80 to 160 MHz) in the 5 GHz frequencies. The IEEE 802.11ac standard is defined only in the 5 GHz band, but initial 11ac chipsets will support even operations in the 2.4 GHz band for the backward compatibility with the existing 2.4 GHz band products. Theoretically, according to the standard, wireless LAN speeds of multiple stations are enabled up to a minimum of 1 Gbps and a maximum single link speed is enabled up to a minimum of 500 Mbps. This is achieved by extending concepts of a radio interface accepted by 802.11n, such as a wider radio frequency bandwidth (a maximum of 160 MHz), more MIMO spatial streams (a maximum of 8), multi-user MIMO, and high-density modulation (a maximum of 256 QAM). Further, as a scheme that transmits data by using a 60 GHz band instead of the existing 2.4 GHz/5 GHz, IEEE 802.11ad has been provided. The IEEE 802.11ad is a transmission standard that provides a speed of a maximum of 7 Gbps by using a beamforming technology and is suitable for high bit rate moving picture streaming such as massive data or non-compression HD video. However, since it is difficult for the 60 GHz frequency band to pass through an obstacle, it is disadvantageous in that the 60 GHz frequency band can be used only among devices in a short-distance space.

Meanwhile, in recent years, as next-generation wireless LAN standards after the 802.11ac and 802.11ad, discussion for providing a high-efficiency and high-performance wireless LAN communication technology in a high-density environment is continuously performed. That is, in a next-generation wireless LAN environment, communication having high frequency efficiency needs to be provided indoors/outdoors under the presence of high-density stations and access points (APs) and various technologies for implementing the communication are required.

Especially, as the number of devices using a wireless LAN increases, it is necessary to efficiently use a predetermined channel. Therefore, required is a technology capable of efficiently using bandwidths by simultaneously transmitting data between a plurality of stations and APs.

DISCLOSURE

Technical Problem

An object of the present invention is to provide an efficient wireless communication method and wireless communication terminal.

An object of the present invention is to provide a wireless communication method in which a plurality of wireless communication terminals transmit data to one wireless communication terminal simultaneously and a wireless communication terminal.

Technical Solution

According to an embodiment of the present invention, a wireless communication terminal includes: a transceiver for transmitting/receiving a wireless signal; and a processor for controlling an operation of the wireless communication terminal, wherein the transceiver receives, from a base wireless communication terminal, a first frame indicating information on a resource that the base wireless communication terminal allocates to a plurality of wireless communication terminals, wherein the plurality of wireless communication terminals include the wireless communication terminal, and transmits data to the base wireless communication terminal based on the first frame.

The transceiver may notify that data is to be transmitted to transmit a second frame for setting a Network Allocation Vector (NAV) of a wireless communication terminal located in a wireless coverage of the wireless communication terminal to the base wireless communication terminal, and the plurality of wireless communication terminals may transmit the second frame at the same time.

At this time, the plurality of wireless communication terminals may transmit the second frame including the same format and the same contents.

Specifically, the plurality of wireless communication terminals may transmit the second frame at the same time using the same data rate and scramble seed.

Additionally, the transceiver may transmit information on a channel state detected by the wireless communication terminal to the base wireless communication terminal.

At this time, the transceiver may transmit the information on the channel state using an orthogonal code.

Specifically, the orthogonal code may be one arbitrarily selected from a plurality of orthogonal codes.

Additionally, the transceiver may transmit a signal modulated using the orthogonal code to the base wireless communication terminal through all channels detected by the wireless communication terminal as idle.

Additionally, the transceiver may receive information on a channel whose state is to be detected by the wireless communication terminal from the base wireless communication terminal, and the processor may detect a channel state based on the information on the channel whose state is to be detected by the wireless communication terminal.

At this time, the transceiver may receive a third frame indicating that the base wireless communication terminal is ready to receive data, and the third frame may signal the information on the channel whose state is to be detected by the wireless communication terminal.

Specifically, a receiver address of the third frame indicates the information on the channel whose state may be to be detected by the wireless communication terminal.

Additionally, the transceiver may receive from the base wireless communication terminal a fourth frame indicating whether the base wireless communication terminal completely receives data from each of the plurality of wireless communication terminals.

At this time, the fourth frame may indicate whether data is received completely for each sub-frequency band of a frequency band in which the fourth frame is transmitted.

Additionally, the first frame may indicate that the base wireless communication terminal is ready to receive data and includes information on a resource allocation for each of the plurality of wireless communication terminals in an extension field form following a Frame Check Sequence (FCS) field, and the FCS field may indicate whether the first frame includes error data.

According to an embodiment of the present invention, a base wireless communication terminal includes: a transceiver for transmitting/receiving a wireless signal; and a processor for controlling an operation of the wireless communication terminal, wherein the transceiver transmits, to the plurality of wireless communication terminals, a first frame indicating information on a resource allocated to a plurality of wireless communication terminals.

At this time, a second frame notifying data transmission of each of the plurality of wireless communication terminals may be received simultaneously from the plurality of wireless communication terminal.

Additionally, the transceiver may receive information on a channel state detected by each of the plurality of wireless communication terminals from the plurality of wireless communication terminals, and the processor may allocate a resource to the plurality of wireless communication terminals based on the information on the channel state detected by each of the plurality of wireless communication terminals.

Specifically, the transceiver may receive, from the plurality of wireless communication terminals, the information on the channel state detected by the plurality of wireless communication terminals, which is modulated using an orthogonal code.

Additionally, the transceiver may transmit a third frame indicating that the base wireless communication terminal is ready to receive data, and the third frame may signal information on a channel whose state is to be detected by the plurality of wireless communication terminals.

According to an embodiment of the present invention, an operation method of a wireless communication terminal includes: receiving a first frame indicating information on a resource that a base wireless communication terminal allocates to a plurality of wireless communication terminals from the base wireless communication terminal, wherein the plurality of wireless communication terminals include the wireless communication terminal; and transmitting data to the base wireless communication terminal based on the first frame.

Advantageous Effects

One embodiment of the present invention provides an efficient wireless communication method and wireless communication terminal.

Especially, one embodiment of the present invention provides a wireless communication method in which one wireless communication terminal transmits data to a plurality of wireless communication terminals simultaneously and a wireless communication terminal.

MODE FOR CARRYING OUT THE INVENTION

Figure 1:
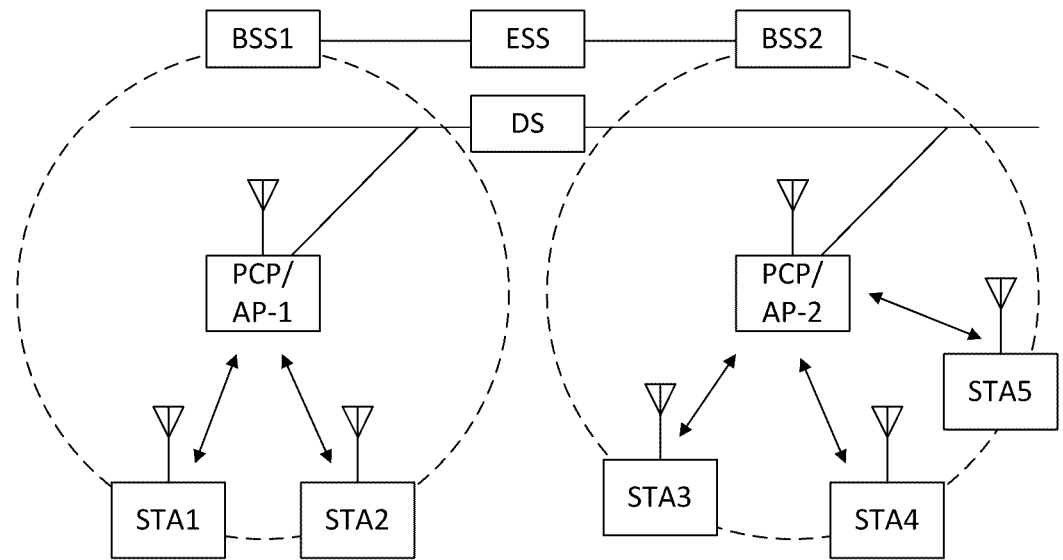
FIG. 1 is a view illustrating a wireless LAN system according to an embodiment of the present invention.

Preferred embodiments of the present invention will be described below in more detail with reference to the accompanying drawings. The present invention may, however, be embodied in different forms and should not be constructed as limited to the embodiments set forth herein. Parts not relating to description are omitted in the drawings in order to clearly describe the present invention and like reference numerals refer to like elements throughout.

Furthermore, when it is described that one comprises (or includes or has) some elements, it should be understood that it may comprise (or include or has) only those elements, or it may comprise (or include or have) other elements as well as those elements if there is no specific limitation.

This application claims priority to and the benefit of Korean Patent Application Nos. 10-2014-0168563, Nos. 10-2015-0002950, and Nos. 10-2015-0033942 filed in the Korean Intellectual Property Office and the embodiments and mentioned items described in the respective applications are included in the Detailed Description of the present application.

FIG. 1 is a diagram illustrating a wireless LAN system according to an embodiment of the present invention. The wireless LAN system includes one or more basic service sets (BSS) and the BSS represents a set of apparatuses which are successfully synchronized with each other to communicate with each other. In general, the BSS may be classified into an infrastructure BSS and an independent BSS (IBSS) and FIG. 1 illustrates the infrastructure BSS between them.

As illustrated in FIG. 1, the infrastructure BSS (BSS1 and BSS2) includes one or more stations STA1, STA2, STA3, STA4, and STA5, access points PCP/AP-1 and PCP/AP-2 which are stations providing a distribution service, and a distribution system (DS) connecting the multiple access points PCP/AP-1 and PCP/AP-2.

The station (STA) is a predetermined device including medium access control (MAC) following a regulation of an IEEE 802.11 standard and a physical layer interface for a radio medium, and includes both a non-access point (non-AP) station and an access point (AP) in a broad sense. Further, in the present specification, a term 'terminal' may be used to refer to a concept including a wireless LAN communication device such as non-AP STA, or an AP, or both terms. A station for wireless communication includes a processor and a transceiver and according to the embodiment, may further include a user interface unit and a display unit. The processor may generate a frame to be transmitted through a wireless network or process a frame received through the wireless network and besides, perform various processing for controlling the station. In addition, the transceiver is functionally connected with the processor and transmits and receives frames through the wireless network for the station.

The access point (AP) is an entity that provides access to the distribution system (DS) via wireless medium for the station associated therewith. In the infrastructure BSS, communication among non-AP stations is, in principle, performed via the AP, but when a direct link is configured, direct communication is enabled even among the non-AP stations. Meanwhile, in the present invention, the AP is used as a concept including a personal BSS coordination point (PCP) and may include concepts including a centralized controller, a base station (BS), a node-B, a base transceiver system (BTS), and a site controller in a broad sense.

A plurality of infrastructure BSSs may be connected with each other through the distribution system (DS). In this case, a plurality of BSSs connected through the distribution system is referred to as an extended service set (ESS).

Figure 2:
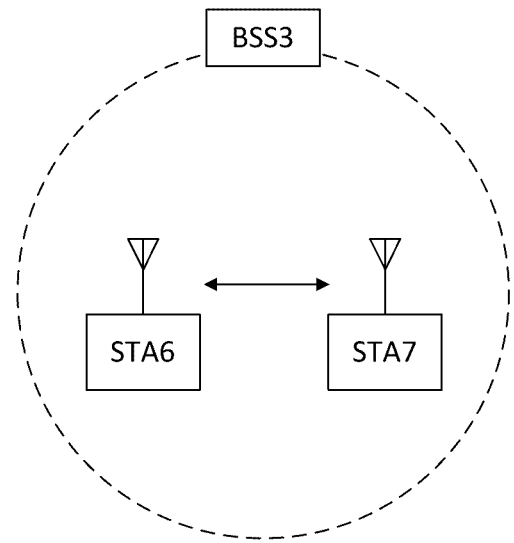
FIG. 2 is a view illustrating a wireless LAN system according to another embodiment of the present invention.

FIG. 2 illustrates an independent BSS which is a wireless LAN system according to another embodiment of the present invention. In the embodiment of FIG. 2, duplicative description of parts, which are the same as or correspond to the embodiment of FIG. 1, will be omitted.

Since a BSS3 illustrated in FIG. 2 is the independent BSS and does not include the AP, all stations STA6 and STA7 are not connected with the AP. The independent BSS is not permitted to access the distribution system and forms a self-contained network. In the independent BSS, the respective stations STA6 and STA7 may be directly connected with each other.

Figure 3:
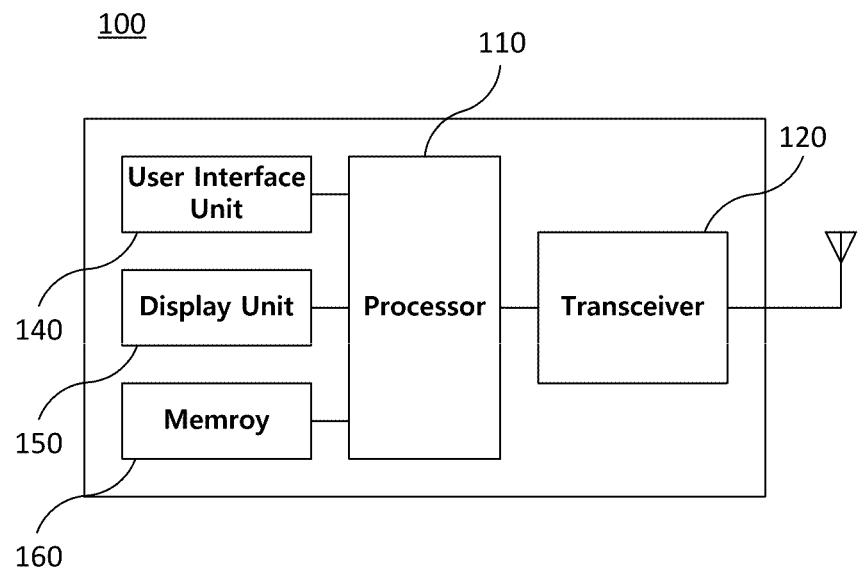
FIG. 3 is a block diagram illustrating a configuration of a station according to an embodiment of the present invention.

FIG. 3 is a block diagram illustrating a configuration of a station 100 according to an embodiment of the present invention.

As illustrated in FIG. 3, the station 100 according to the embodiment of the present invention may include a processor 110, a transceiver 120, a user interface unit 140, a display unit 150, and a memory 160.

First, the transceiver 120 transmits and receives a radio signal such as a wireless LAN packet, or the like and may be embedded in the station 100 or provided as an exterior. According to the embodiment, the transceiver 120 may include at least one transmit/receive module using different frequency bands. For example, the transceiver 120 may include transmit/receive modules having different frequency bands such as 2.4 GHz, 5 GHz, and 60 GHz. According to an embodiment, the station 100 may include a transmit/receive module using a frequency band of 6 GHz or more and a transmit/receive module using a frequency band of 6 GHz or less. The respective transmit/receive modules may perform wireless communication with the AP or an external station according to a wireless LAN standard of a frequency band supported by the corresponding transmit/receive module. The transceiver 120 may operate only one transmit/receive module at a time or simultaneously operate multiple transmit/receive modules together according to the performance and requirements of the station 100. When the station 100 includes a plurality of transmit/receive modules, each transmit/receive module may be implemented by independent elements or a plurality of modules may be integrated into one chip.

Next, the user interface unit 140 includes various types of input/output means provided in the station 100. That is, the user interface unit 140 may receive a user input by using various input means and the processor 110 may control the station 100 based on the received user input. Further, the user interface unit 140 may perform output based on a command of the processor 110 by using various output means.

Next, the display unit 150 outputs an image on a display screen. The display unit 150 may output various display objects such as contents executed by the processor 110 or a user interface based on a control command of the processor 110, and the like. Further, the memory 160 stores a control program used in the station 100 and various resulting data. The control program may include an access program required for the station 100 to access the AP or the external station.

The processor 110 of the present invention may execute various commands or programs and process data in the station 100. Further, the processor 110 may control the respective units of the station 100 and control data transmission/reception among the units. According to the embodiment of the present invention, the processor 110 may execute the program for accessing the AP stored in the memory 160 and receive a communication configuration message transmitted by the AP. Further, the processor 110 may read information on a priority condition of the station 100 included in the communication configuration message and request the access to the AP based on the information on the priority condition of the station 100. The processor 110 of the present invention may represent a main control unit of the station 100 and according to the embodiment, the processor 110 may represent a control unit for individually controlling some component of the station 100, for example, the transceiver 120, and the like. The processor 110 controls various operations of radio signal transmission/reception of the station 100 according to the embodiment of the present invention. A detailed embodiment thereof will be described below.

The station 100 illustrated in FIG. 3 is a block diagram according to an embodiment of the present invention, where separate blocks are illustrated as logically distinguished elements of the device. Accordingly, the elements of the device may be mounted in a single chip or multiple chips depending on design of the device. For example, the processor 110 and the transceiver 120 may be implemented while being integrated into a single chip or implemented as a separate chip. Further, in the embodiment of the present invention, some components of the station 100, for example, the user interface unit 140 and the display unit 150 may be optionally provided in the station 100.

Figure 4:
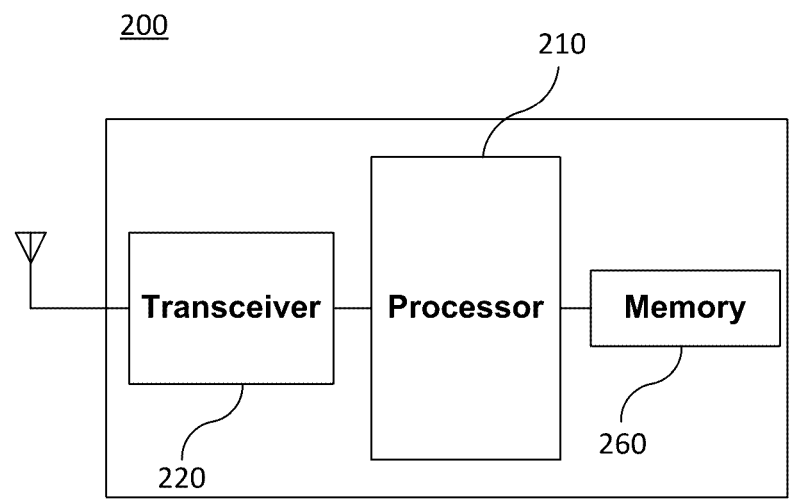
FIG. 4 is a block diagram illustrating a configuration of an access point according to an embodiment of the present invention.

FIG. 4 is a block diagram illustrating a configuration of an AP 200 according to an embodiment of the present invention.

As illustrated in FIG. 4, the AP 200 according to the embodiment of the present invention may include a processor 210, a transceiver 220, and a memory 260. In FIG. 4, among the components of the AP 200, duplicative description of parts which are the same as or correspond to the components of the station 100 of FIG. 2 will be omitted.

Referring to FIG. 4, the AP 200 according to the present invention includes the transceiver 220 for operating the BSS in at least one frequency band. As described in the embodiment of FIG. 3, the transceiver 220 of the AP 200 may also include a plurality of transmit/receive modules using different frequency bands. That is, the AP 200 according to the embodiment of the present invention may include two or more transmit/receive modules among different frequency bands, for example, 2.4 GHz, 5 GHz, and 60 GHz together. Preferably, the AP 200 may include a transmit/receive module using a frequency band of 6 GHz or more and a transmit/receive module using a frequency band of 6 GHz or less. The respective transmit/receive modules may perform wireless communication with the station according to a wireless LAN standard of a frequency band supported by the corresponding transmit/receive module. The transceiver 220 may operate only one transmit/receive module at a time or simultaneously operate multiple transmit/receive modules together according to the performance and requirements of the AP 200.

Next, the memory 260 stores a control program used in the AP 200 and various resulting data. The control program may include an access program for managing the access of the station. Further, the processor 210 may control the respective units of the AP 200 and control data transmission/reception among the units. According to the embodiment of the present invention, the processor 210 may execute the program for accessing the station stored in the memory 260 and transmit communication configuration messages for one or more stations. In this case, the communication configuration messages may include information about access priority conditions of the respective stations. Further, the processor 210 performs an access configuration according to an access request of the station. The processor 210 controls various operations such as radio signal transmission/reception of the AP 200 according to the embodiment of the present invention. A detailed embodiment thereof will be described below.

Figure 5:
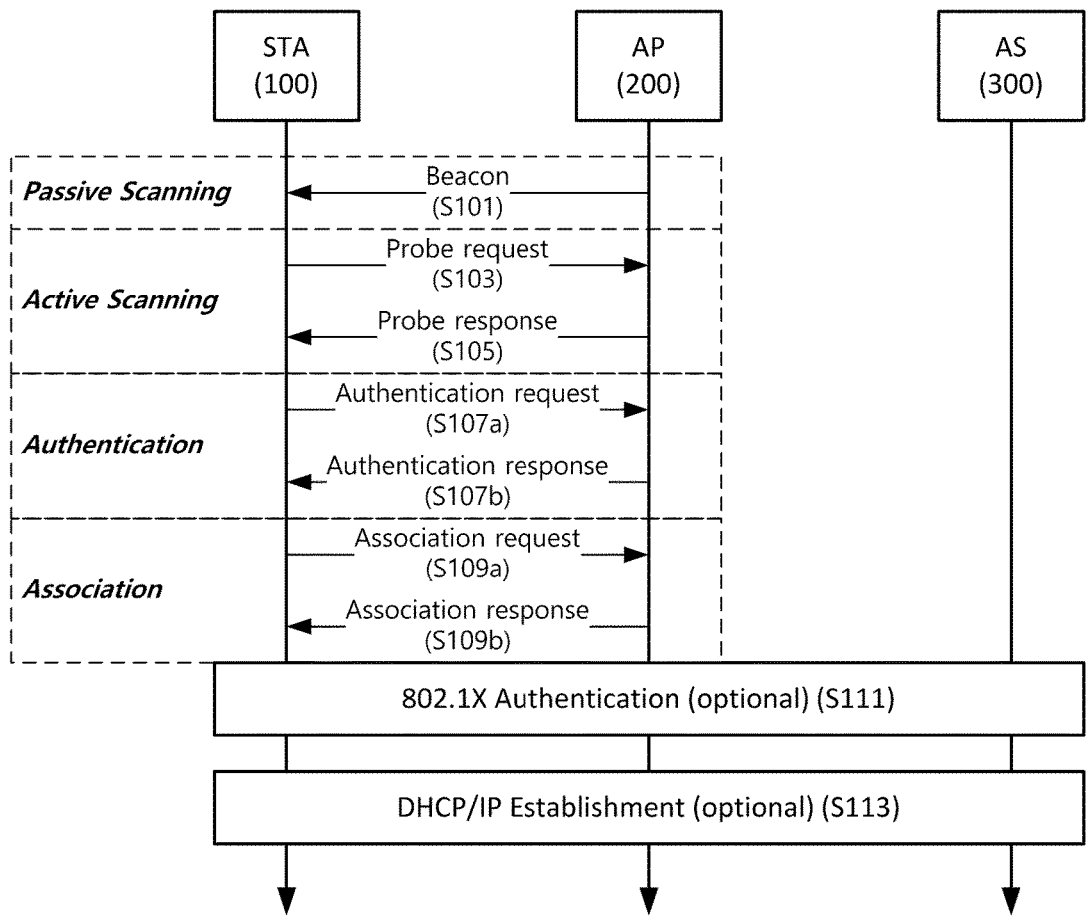
FIG. 5 is a view illustrating a process that a station sets an access point and a link according to an embodiment of the present invention.

FIG. 5 is a diagram schematically illustrating a process in which a STA sets a link with an AP.

Referring to FIG. 5, the link between the STA 100 and the AP 200 is set through three steps of scanning, authentication, and association in a broad way. First, the scanning step is a step in which the STA 100 obtains access information of BSS operated by the AP 200. A method for performing the scanning includes a passive scanning method in which the AP 200 obtains information by using a beacon message (S101) which is periodically transmitted and an active scanning method in which the STA 100 transmits a probe request to the AP (S103) and obtains access information by receiving a probe response from the AP (S105).

The STA 100 that successfully receives wireless access information in the scanning step performs the authentication step by transmitting an authentication request (S107*a*) and receiving an authentication response from the AP 200 (S107*b*). After the authentication step is performed, the STA 100 performs the association step by transmitting an association request (S109*a*) and receiving an association response from the AP 200 (S109*b*).

Meanwhile, an 802.1X based authentication step (S111) and an IP address obtaining step (S113) through DHCP may be additionally performed. In FIG. 5, the authentication server 300 is a server that processes 802.1X based authentication with the STA 100 and may be present in physical association with the AP 200 or present as a separate server.

When data is transmitted using Orthogonal Frequency Division Modulation (OFDMA) or Multi Input Multi Output (MIMO), any one wireless communication terminal may transmit data to a plurality of wireless communication terminals simultaneously. Also, any one wireless communication terminal may simultaneously receive data from a plurality of wireless communication terminals.

For convenience of description, any one wireless communication terminal that communicates simultaneously with a plurality of wireless communication terminals is referred to as a first wireless communication terminal and a plurality of wireless communication terminals that simultaneously communicate with the first wireless communication terminal are referred to as a plurality of second wireless communication terminals. In addition, the first wireless communication terminal may be referred to as a base wireless communication terminal. In addition, the first wireless communication terminal may be a wireless communication terminal that allocates a communication medium resource and performs scheduling in communication with a plurality of wireless communication terminals. Specifically, the first wireless communication terminal may perform the role of a cell coordinator. At this time, the first wireless communication terminal may be the access point 200. In addition, the second wireless communication terminal may be the station 100 associated with the access point 200. In a specific embodiment, the first wireless communication terminal may be a wireless communication terminal that allocates a communication medium resource and performs scheduling in an independent network, such as an ad-hoc network, which is not connected to an external distribution service. In addition, the first wireless communication terminal may be at least one of a base station, an eNB, and a transmission point TP.

It is described with reference to FIGS. 6 and 21 that any one second wireless communication terminal transmits data to the first wireless communication terminal. Specifically, it is described with reference to FIGS. 6 to 9 that a plurality of second wireless communication terminals and a first wireless communication terminal set up a network allocation vector (NAV). At this time, the NAV is an indicator indicating a time period during which a wireless communication terminal is not able to access a wireless medium regardless of whether a wireless medium is idle or not.

Figure 6:
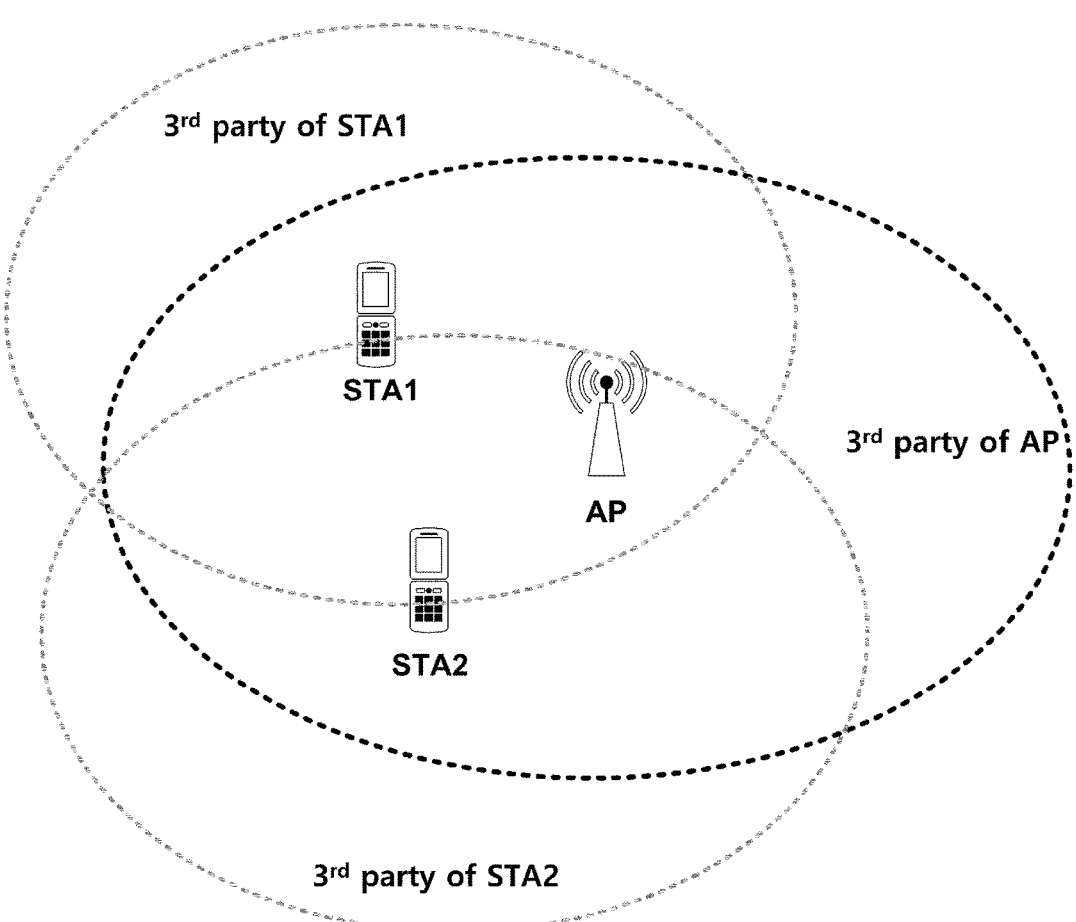
FIG. 6 is a view illustrating a basic service set where a wireless communication terminal is located according to an embodiment of the present invention.

FIG. 6 is a view illustrating a basic service set where a wireless communication terminal is located according to an embodiment of the present invention.

Due to the characteristics of a wireless network, the wireless communication coverage covered by each wireless communication terminal may be different. At this time, the wireless communication coverage indicates a range of an area where each wireless communication terminal is able to receive and transmit a wireless communication signal. Especially, even a plurality of wireless communication terminals located in the same BSS may have their different wireless communication coverage. Therefore, even a plurality of wireless communication terminals belonging to the same BSS may receive different wireless communication signals, and a range of an area where wireless communication signals transmitted by the plurality of wireless communication terminals are received may be different. In such a case, when data is transmitted between the wireless communication terminals, other wireless communication terminals that do not belong to the corresponding BSS may access a frequency band used for data transmission.

For example, in the drawing of FIG. 6, the access point AP, the first station STA1, and the second station STA2 belong to the same BSS. However, the wireless communication signals transmitted by the first station STA1 and the second station STA2 do not reach an area (e.g., a 3rd party AP) of the wireless communication coverage of the access point AP. Therefore, during the transmission of data from the first station STA1 and the second station STA2 to the access point AP, the wireless communication terminal located in an area (e.g., a 3rd party AP) of the wireless communication coverage of the access point AP may access a frequency band that the first station STA1 and the second station STA2 use for data transmission. Therefore, in order to prevent this, it is necessary for the access point AP, the first station STA1, and the second station STA2 to set the NAV to prevent access to another wireless communication terminal. Especially, when the first wireless communication terminal and the plurality of second wireless communication terminals communicate, it is necessary to set the NAV for the wireless communication coverage of each of the plurality of second wireless communication terminals. This will be described with reference to FIGS. 7 and 9.

Figure 7:
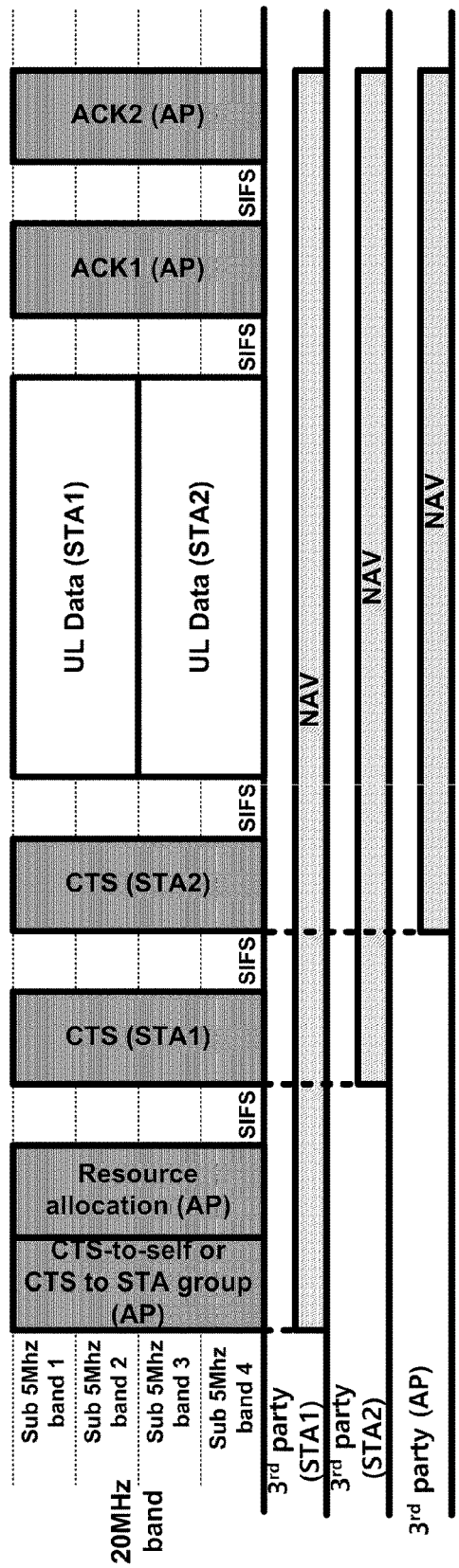
FIG. 7 is a view illustrating an access point and a plurality of stations set a NAV and transmit data through a CTS frame according to an embodiment of the present invention.

FIG. 7 is a view illustrating an access point and a plurality of stations set a NAV and transmit data through a CTS frame according to an embodiment of the present invention.

The first wireless communication terminal transmits to the plurality of second wireless communication terminals a reception ready frame indicating that it is ready to receive data. At this time, the first wireless communication terminal may transmit a reception ready frame to the plurality of second wireless communication terminals through a contention-based access using a back-off. Specifically, when a channel is idle for a predetermined time, the first wireless communication terminal may transmit a reception ready frame to the plurality of second wireless communication terminals. At this time, the predetermined time may be an arbitration inter-frame space (AIFS) or a DCF inter-frame space (DIFS) defined in the 802.11 standard.

The reception ready frame may follow the RTS frame format defined by the 802.11 standard. However, when the reception ready frame is in the RTS frame format, a wireless communication terminal included in the wireless communication coverage of the first wireless communication terminal but not included in the wireless communication coverage of the second wireless communication terminal may determine that the RTS frame is timeout before the ACK frame transmission time point of the first wireless communication terminal.

Therefore, the reception ready frame may follow the CTS frame format defined by the 802.11 standard. In particular, the reception ready frame may be a CTS frame in which a receiver address (RA) is an address of a second wireless communication terminal transmitting a CTS frame. In addition, the RA of the reception ready frame may be a group address indicating a plurality of second wireless communication terminals. Through transmission of the reception preparation frame, the first wireless communication terminal sets the NAV of a wireless communication terminal included in the wireless communication coverage of the first wireless communication terminal.

In addition, the first wireless communication terminal transmits a resource allocation frame for signaling the resources allocated to each of the plurality of second wireless communication terminals to the plurality of second wireless communication terminals. In a specific embodiment, the resource allocation frame and the reception ready frame may be one frame. The resource allocation frame may be referred to as a trigger frame since it triggers the data transmission of the second wireless communication terminal. The resource allocation frame will be described in detail again with reference to FIG. 16 to FIG. 18.

The second wireless communication terminal transmits to the first wireless communication terminal a transmission notifying frame for notifying that the data is to be transmitted. The transmission notifying frame sets the NAV of the wireless communication terminal located in the wireless coverage of the second wireless communication terminal. Specifically, the plurality of second wireless communication terminals may sequentially transmit a transmission notifying frame. Specifically, the plurality of second wireless communication terminals may transmit a transmission notifying frame. Here, the predetermined time interval may be a short inter-frame space (SIFS) frame defined by the 802.11 standard. In a specific embodiment, the transmission order of the plurality of second wireless communication terminals may be the order of the subcarriers allocated to each of the plurality of second wireless communication terminals. The transmission notifying frame may follow the format of the CTS frame. Specifically, the RA of the CTS frame may indicate the first wireless communication terminal. Through transmission of the transmission notifying frame, the second wireless communication terminal sets the NAV of the wireless communication terminal included in the wireless communication coverage of the second wireless communication terminal.

The second wireless communication terminal transmits data to the first wireless communication terminal through the resource allocated to the second wireless communication terminal. Specifically, the second wireless communication terminal transmits data to the first wireless communication terminal after a predetermined time from transmission of the transmission notifying frame. At this time, the predetermined time may be SIFS defined in the 802.11 standard.

The first wireless communication terminal that receives the data transmits a reception completion frame indicating completion of reception to the second wireless communication terminal that transmits the data. Specifically, the first wireless communication terminal may sequentially transmit the reception completion frame to each of the plurality of second wireless communication terminals. In a specific embodiment, the first wireless communication terminal may transmit the reception completion frame to each of the plurality of second wireless communication terminals at predetermined intervals. At this time, the predetermined time may be SIFS defined in the 802.11 standard. In addition, in a specific embodiment, the reception completion frame may be an ACK frame.

The specific operations of the first wireless communication terminal and the second wireless communication terminal will be described with reference to FIG. 7.

In the embodiment of FIG. 7, the access point AP receives data from each of the first station STA1 and the second station STA2. Specifically, the access point AP receives data from each of the first station STA1 and the second station STA2 through the following process.

The access point AP allocates a resource to each of the first station STA1 and the second station STA2.

The access point AP transmits a CTS frame having the group address indicating the first station STA1 and the second station STA2 as an RA. Alternatively, the access point AP transmits a CTS frame having the address indicating the access point AP as an RA. Through this, the access point AP sets the NAV of a wireless communication terminal located in the wireless communication coverage of the access point AP.

The access point AP transmits a resource allocation frame for signaling a resource allocated to each of the first station STA1 and the second station STA2.

The first station STA1 and the second station STA2 obtain information on frequency bands allocated to the first station STA1 and the second station STA2 based on the resource allocation frame.

The first station STA1 and the second station STA2 transmit to the access point AP a CTS frame for notifying that the data is to be sequentially transmitted. Specifically, the first station STA1 and the second station STA2 transmit a CTS frame to the access point AP at SIFS intervals. Through this, the first station STA1 sets the NAV of a wireless communication terminal located in the wireless coverage of the first station STA1 and the second station STA2 sets the NAV of a wireless communication terminal located in the wireless coverage of the second station STA2.

The first station STA1 and the second station STA2 transmit data to the access point AP through a resource allocated to each.

The access point AP receives data from the first station STA1 and the second station STA2 through the resources allocated to the first station STA1 and the second station STA2, respectively.

The access point AP transmits an ACK frame indicating completion of reception to each of the first station STA1 and the second station STA2. Specifically, the access point AP transmits an ACK frame to the first station STA1, and transmits an ACK frame to the second station STA2 after SIFS.

When the second wireless communication terminal does not transmit the transmission notifying frame to the first wireless communication terminal, the operation of the first wireless communication terminal will be described with reference to FIG. 8.

Figure 8:
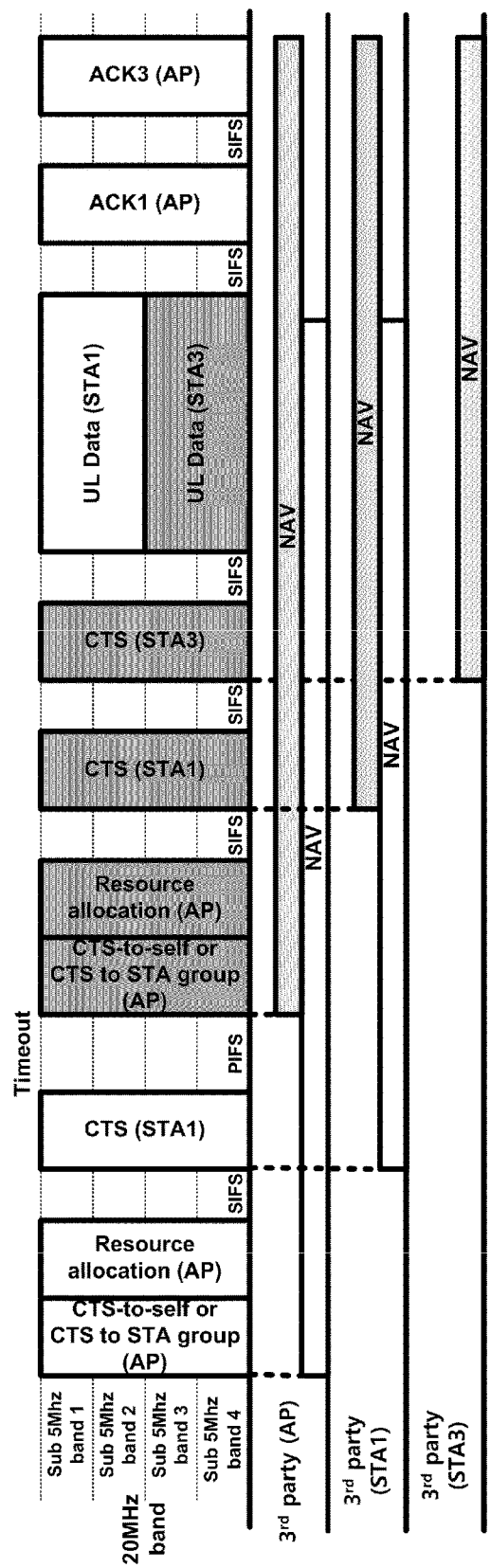
FIG. 8 is a view illustrating that when an access point according to an embodiment of the present invention does not receive a CTS frame, data is transmitted to a plurality of stations by allocating resources again.

FIG. 8 is a view illustrating that when an access point according to an embodiment of the present invention does not receive a CTS frame, data is transmitted to a plurality of stations by allocating resources again.

The first wireless communication terminal may not receive the transmission notifying frame from the second wireless communication terminal after transmitting the reception ready frame and the resource allocation frame to the second wireless communication terminal. In such a case, the first wireless communication terminal allocates the resource allocated to the second wireless communication terminal to another second wireless communication terminal. Specifically, the first wireless communication terminal transmits a reception ready frame and a resource allocation frame to the second wireless communication terminal, and waits for a predetermined time. If the transmission notifying frame is not received from the second wireless communication terminal while waiting for a predetermined time, the first wireless communication terminal allocates the resource allocated to the second wireless communication terminal to another second wireless communication terminal. At this time, the predetermined time is SIFS defined in the 802.11 standard.

The first wireless communication terminal transmits a reception ready frame. At this time, the reception ready frame may include information for signaling a second wireless communication terminal that newly receives an allocated resource. Specifically, the first wireless communication terminal may transmit a reception ready frame after a predetermined time from the preceding frame. At this time, the predetermined time may be a PCF inter-frame space (PIFS) defined by the 802.11 standard.

The first wireless communication terminal transmits to the second wireless communication terminal a resource allocation frame including information for signaling the reallocated resources.

Then, the operations of the second wireless communication terminal and the first wireless communication terminal may be the same as those described above.

The specific operations of the first wireless communication terminal and the second wireless communication terminal will be described with reference to FIG. 8.

In the embodiment of FIG. 8, the access point AP allocates a resource to each of the first station STA1 and the second station STA2.

The access point AP transmits a CTS frame having the group address indicating the first station STA1 and the second station STA2 as an RA. Alternatively, the access point AP transmits a CTS frame having the address indicating the access point AP as an RA. Through this, the access point AP sets the NAV of a wireless communication terminal located in the wireless communication coverage of the access point AP.

The access point AP transmits a resource allocation frame for signaling a resource allocated to each of the first station STA1 and the second station STA2.

The first station STA1 transmits to the access point AP a CTS frame for notifying that the data is to be transmitted. The second station STA2 does not transmit to the access point AP a CTS frame for notifying that data is to be transmitted.

The access point AP allocates resources to the first station STA1 and the third station STA3.

After PIFS from the CTS frame of the first station STA1, the access point AP transmits a CTS frame having the group address indicating the first station STA1 and the third station STA3 as an RA. Alternatively, after PIFS from the CTS frame of the first station STA1, the access point AP transmits a CTS frame having the address indicating the access point AP as an RA. Through this, the access point AP again sets the NAV of a wireless communication terminal located in the wireless communication coverage of the access point AP.

The access point AP transmits a resource allocation frame for signaling a resource allocated to each of the first station STA1 and the third station STA3.

The first station STA1 and the third station STA3 sequentially transmit to the access point AP a CTS frame for notifying that the data is to be transmitted. Specifically, the first station STA1 and the third station STA3 transmit a CTS frame to the access point AP at SIFS intervals. Through this, the first station STA1 sets the NAV of a wireless communication terminal located in the wireless coverage of the first station STA1 and the third station STA3 sets the NAV of a wireless communication terminal located in the wireless coverage of the third station STA3.

The first station STA1 and the third station STA3 transmit data to the access point AP through a resource allocated to each.

The access point AP receives data from the first station STA1 and the third station STA3 through the resources allocated to the first station STA1 and the third station STA3, respectively.

The access point AP transmits an ACK frame indicating completion of reception to each of the first station STA1 and the third station STA3. Specifically, the access point AP transmits an ACK frame to the first station STA1, and after SIFS, transmits an ACK frame to the third station STA3.

In the embodiment illustrated through FIGS. 7 to 8, the plurality of second wireless communication terminals sequentially transmit transmission notifying frames. Accordingly, as the number of the second wireless communication terminals that transmit data to the first wireless communication terminal increases, the time required for the plurality of second wireless communication terminals to transmit the transmission notifying frame increases. This makes data transmission between the plurality of second wireless communication terminal and the first wireless communication terminal ineffective. Therefore, a method for solving this is needed. This will be described with reference to FIG. 9.

Figure 9:
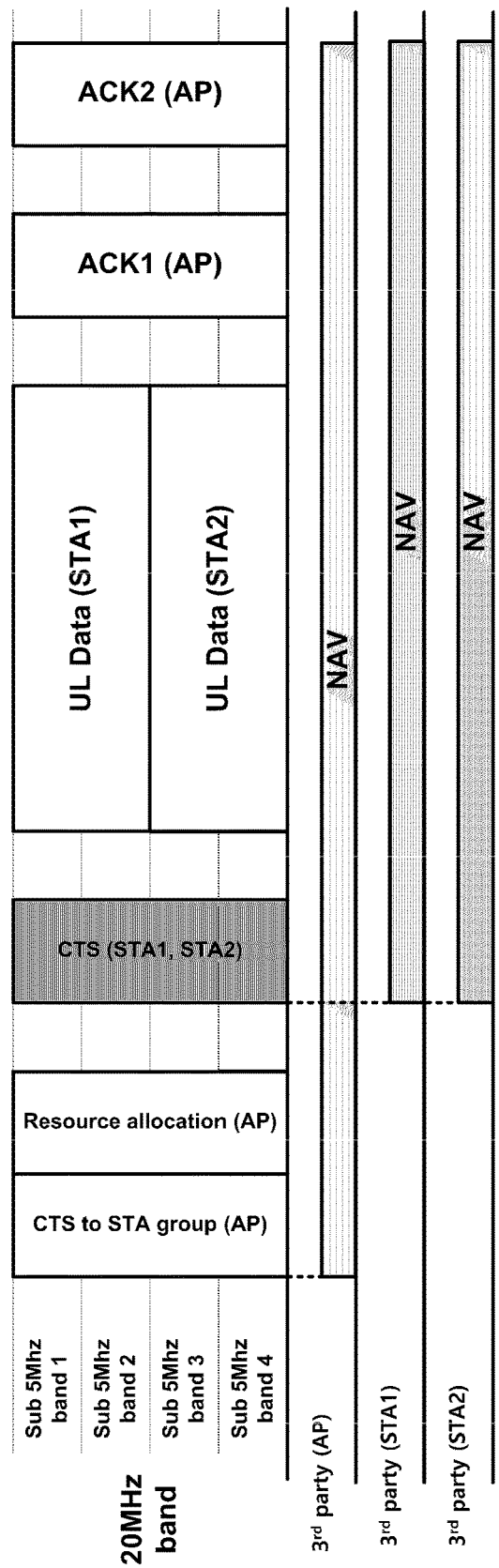
FIG. 9 is a view illustrating that an access point and a station set up a NAV at the same time through a CTS frame according to an embodiment of the present invention.

FIG. 9 is a view illustrating that an access point and a station set up a NAV at the same time through a CTS frame according to an embodiment of the present invention.

The plurality of second wireless communication terminals may transmit a transmission notifying frame to the first wireless communication terminal at the same time. Specifically, the plurality of second wireless communication terminals may simultaneously transmit the transmission notifying frame including the same format and the same contents. At this time, the transmission address of the transmission notifying frame may be a group address indicating a plurality of second wireless communication terminals.

In addition, the plurality of second wireless communication terminals may simultaneously transmit the transmission notifying frame using the same data rate and scramble seed. Specifically, the plurality of second wireless communication terminals may simultaneously transmit a transmission notifying frame based on a Modulation & Coding Scheme (MCS) or a data rate of a reception ready frame. In another specific embodiment, the plurality of second wireless communication terminals may simultaneously transmit the transmission notifying frame based on the MCS or the data rate of the resource allocation frame. In such a case, even if the plurality of second wireless communication terminals simultaneously transmit the transmission notifying frame, collision does not occur between transmission notifying frames.

The transmission notifying frame may be in a format receivable by a legacy wireless communication terminal that does not support an embodiment of the present invention. Therefore, the second wireless communication terminal may transmit the transmission notifying frame through the frequency band having the minimum unit frequency bandwidth. At this time, the minimum unit frequency bandwidth represents a minimum bandwidth used by the first wireless communication terminal. Specifically, the second wireless communication terminal may have a frequency band allocated to the second wireless communication terminal and transmit the transmission notifying frame through the frequency band having the minimum unit frequency band. In another specific embodiment, the second wireless communication terminal may transmit a transmission notifying frame through a primary channel having a minimum unit frequency bandwidth. In a specific embodiment, the minimum unit frequency bandwidth may be 20 MHz. In a specific embodiment, the transmission notifying frame may be a CTS frame. In addition, a CTS frame transmitted by a plurality of second wireless communication terminals at the same time may be referred to as a simultaneous CTS frame. Alternatively, a CTS frame transmitted by a plurality of second wireless communication terminals at the same time may be referred to as a duplicated CTS frame.

Through such an operation, the plurality of second wireless communication terminals may set the NAV of a wireless communication terminals located in the wireless communication coverage of each of the plurality of second wireless communication terminals. In addition, it may reduce the time for transmitting a transmission notifying frame to set the NAV. Further, even if the number of the second wireless communication terminals is increased, the time required to transmit the transmission notifying frame does not increase.

Since the plurality of second wireless communication terminals transmit the same transmission notifying frame, the first wireless communication terminal may not know which of the plurality of second wireless communication terminals transmits the transmission notifying frame. Accordingly, even if any one of the plurality of second wireless communication terminals does not transmit the transmission notifying frame, the first wireless communication terminal may not allocate the frequency band allocated to the second wireless communication terminal to another second wireless communication terminal or reset the NAV of a corresponding frequency band.

Other than that, the operations of the first wireless communication terminal and the second wireless communication terminal may be the same as those described above.

The specific operations of the first wireless communication terminal and the second wireless communication terminal will be described with reference to FIG. 9.

In the embodiment of FIG. 9, the access point AP receives data from each of the first station STA1 and the second station STA2. Specifically, the access point AP receives data from each of the first station STA1 and the second station STA2 through the following process.

The access point AP allocates a resource to each of the first station STA1 and the second station STA2.

The access point AP transmits a CTS frame having the group address indicating the first station STA1 and the second station STA2 as an RA. Through this, the access point AP sets the NAV of a wireless communication terminal located in the wireless communication coverage of the access point AP.

The access point AP transmits a resource allocation frame for signaling a resource allocated to each of the first station STA1 and the second station STA2.

The first station STA1 and the second station STA2 obtain information on a resource allocated to the first station STA1 and the second station STA2 based on the resource allocation frame.

The first station STA1 and the second station STA2 transmit to the access point AP a CTS frame for notifying that the data is to be transmitted simultaneously. As described above, the transmission address of the CTS frame may be a group address indicating a group including the first station STA2 and the second station STA2. In addition, the first station STA1 and the second station STA2 transmit the CTS frame to the access point AP using the same data rate and the scramble seed. The first station STA1 sets the NAV of a wireless communication terminal located in the wireless coverage of the first station STA1 and the second station STA2 sets the NAV of a wireless communication terminal located in the wireless coverage of the second station STA2.

The first station STA1 and the second station STA2 transmit data to the access point AP through a resource allocated to each.

The access point AP receives data from the first station STA1 and the second station STA2 through the resources allocated to the first station STA1 and the second station STA2, respectively.

The access point AP transmits an ACK frame indicating completion of reception to each of the first station STA1 and the second station STA2. Specifically, the access point AP transmits an ACK frame to the first station STA1, and after SIFS, transmits an ACK frame to the second station STA2.

It is described with reference to FIGS. 10 to 15 that how the first wireless communication terminal allocates a resource to the plurality of second wireless communication terminals.

Figure 10:
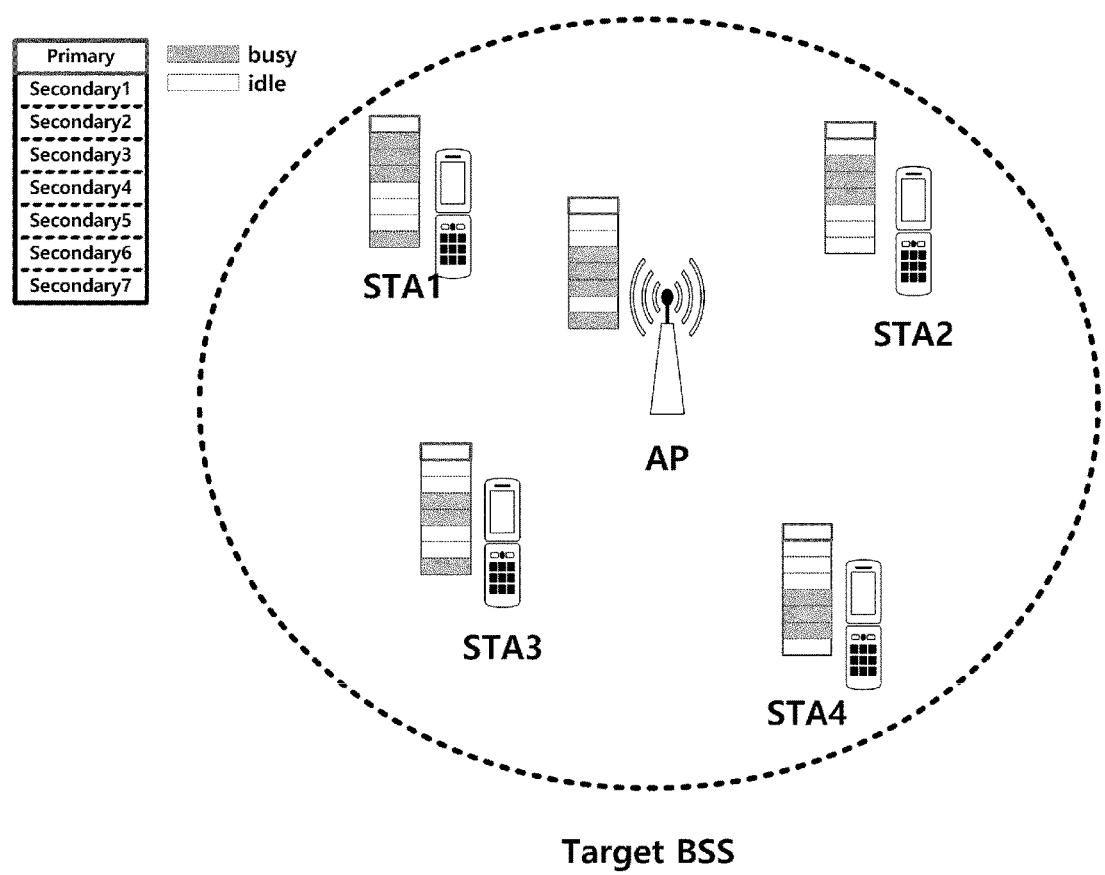
FIG. 10 is a view illustrating a basic service set where a plurality of wireless communication terminals are located according to another embodiment of the present invention.

FIG. 10 is a view illustrating a basic service set where a plurality of wireless communication terminals are located according to another embodiment of the present invention.

Since the wireless communication coverage of each wireless communication terminal is different, the channel state detected by the first wireless communication terminal and the plurality of second wireless communication terminals may be different. Therefore, when the first wireless communication terminal allocates a channel to each of the plurality of second wireless communication terminals in consideration of only the channel state detected by the first wireless communication terminal, the first wireless communication terminal may allocate to the second wireless communication terminal a channel in which a collision with a wireless communication terminal outside the wireless communication coverage of the first wireless communication terminal may occur. Such a situation will be described with reference to the embodiment of FIG. 16.

In the embodiment of FIG. 10, the access point AP detects the primary channel Primary, the first secondary channel Secondary 1, the second secondary channel Secondary 2, and the sixth secondary channel Secondary 6 as idle channels. However, the first station STA1 detects the primary channel Primary, the fourth secondary channel Secondary 4, the fifth secondary channel Secondary 5, and the sixth secondary channel Secondary 6 as idle channels. In addition, the second station STA2 detects the primary channel Primary, the first secondary channel Secondary 1, the fifth secondary channel Secondary 5, the sixth secondary channel Secondary 6, and the seventh secondary channel Secondary 7 as idle channels. In addition, the third station STA3 detects the primary channel Primary, the first secondary channel Secondary 1, the second secondary channel Secondary 2, the fifth secondary channel Secondary 5, and the sixth secondary channel Secondary 6 as idle channels. In addition, the fourth station STA4 detects the primary channel Primary, the first secondary channel Secondary 1, the second secondary channel Secondary 2, the third secondary channel Secondary 3, and the seventh secondary channel Secondary 7 as idle channels.

At this point, when the access point AP allocates the first secondary channel Secondary 1 to the first station STA1, allocates the second secondary channel Secondary 2 to the second station STA2, allocates the primary channel Primary to the third station STA3, and allocates the sixth secondary channel Secondary 6 to the fourth station STA4, the remaining stations except for the third station STA3 may not use the allocated channels. In order to prevent such a situation, the first wireless communication terminal should allocate a frequency band to each of the plurality of second wireless communication terminals in consideration of the channel state detected by each of the plurality of second wireless communication terminals. Specifically, the second wireless communication terminal may transmit information on the channel state detected by the second wireless communication terminal, and the first wireless communication terminal may allocate a frequency band to the second wireless communication terminal based on the received channel state information. This will be described with reference to FIGS. 11 to 15.

Figure 11:
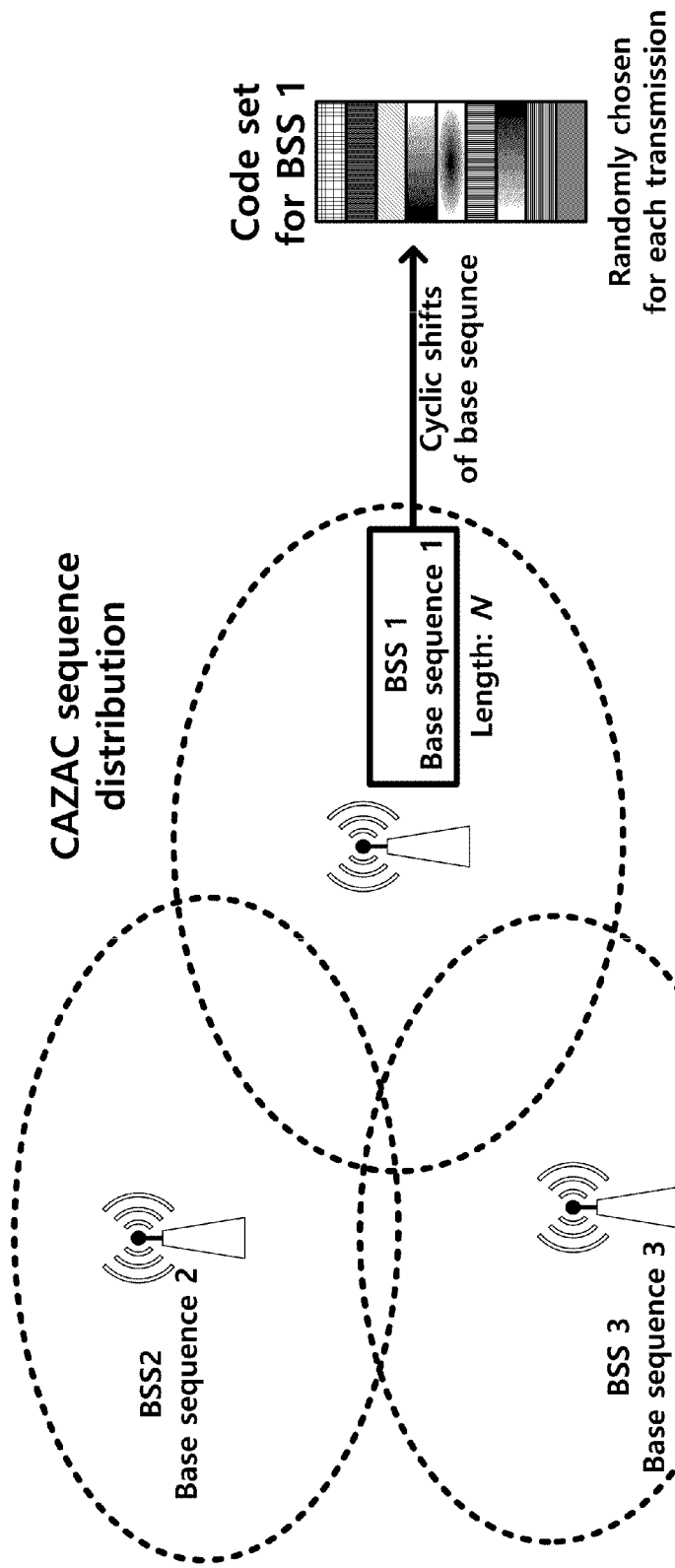
FIG. 11 is a view illustrating that an access point according to another embodiment of the present invention generates an orthogonal code set for random access.

FIG. 11 is a view illustrating that an access point according to another embodiment of the present invention generates an orthogonal code set for random access.

When using a code having orthogonal properties, a plurality of wireless communication terminals may simultaneously transmit different frames to any one wireless communication terminal. Therefore, if using this, a plurality of second wireless communication terminals may simultaneously transmit information on the channel state detected by the plurality of second wireless communication terminals to the first wireless communication terminal.

Specifically, one BSS may set an orthogonal code set to which a plurality of second wireless communication terminals are able to access. Accordingly, the second wireless communication terminal may access the first wireless communication terminal by using any one orthogonal code in the orthogonal code set. In a specific embodiment, a different base sequence than an adjacent BSS is allocated to a BSS. For example, the plurality of base sequences may be allocated to the plurality of BSSs, respectively. In each of a plurality of BSSs, the first wireless communication terminal and the second wireless communication terminal may generate a plurality of orthogonal codes included in the orthogonal code set based on the allocated base sequence. Specifically, the first wireless communication terminal and the second wireless communication terminal may generate a plurality of orthogonal codes included in the orthogonal code set by cyclic-shifting the allocated base sequence.

Specifically, the first wireless communication terminal and the second wireless communication terminal may receive an index indicating a base sequence. At this time, the first wireless communication terminal and the second wireless communication terminal may obtain a base sequence according to the index indicating the base sequence. Thereafter, the first wireless communication terminal and the second wireless communication terminal may generate a plurality of orthogonal codes included in the code set using the base sequence obtained according to the length of a predetermined base sequence and the size of a cyclic shift.

When the BSS uses eight channels in a 20 MHz unit, the length of the base sequence may be eight or more. The length of the base sequence may be longer for stable zero auto-correlation characteristics. Through this, the first wireless communication terminal and the second wireless communication terminal may minimize base sequence interference between adjacent BSSs.

In a specific embodiment, the base sequence may be generated by a Zadoff-Chu sequence that satisfies Constant Amplitude Zero Auto Correlation (CAZAC) characteristics.

Specifically, the second wireless communication terminal may arbitrarily select any one orthogonal code from the generated orthogonal code set and use the selected orthogonal code as a multiple access code. In another specific embodiment, the second wireless communication terminal may use a fixed orthogonal code. Specifically, the fixed orthogonal code may be allocated to the second wireless communication terminal when the first wireless communication terminal associates with the second wireless communication terminal. Alternatively, the fixed orthogonal code may be allocated to the second wireless communication terminal again when the first wireless communication terminal associates with the second wireless communication terminal again. At this time, the fixed orthogonal code may be obtained by calculating the identifier of the second wireless communication terminal with the size and module of the orthogonal code set. At this time, the identifier of the second wireless communication terminal may be an AID for identifying the association of the first wireless communication terminal and the second wireless communication terminal.

When a plurality of second wireless communication terminals are connected using different orthogonal codes, orthogonality is maintained between orthogonal codes. Accordingly, the first wireless communication terminal may know by what code the second wireless communication terminal accesses through the auto-correlation operation with respect to the base sequence. Especially, when the CAZAC sequence is used, the number of codes included in the code set increases as the length of the base sequence increases. Accordingly, the probability of code overlapping between wireless communication terminals is also reduced.

It is described with reference to FIGS. 12 to 15 that how a plurality of second wireless communication terminals transmit the idle state of a frequency band to the first wireless communication terminal using such an orthogonal code.

Figure 12:
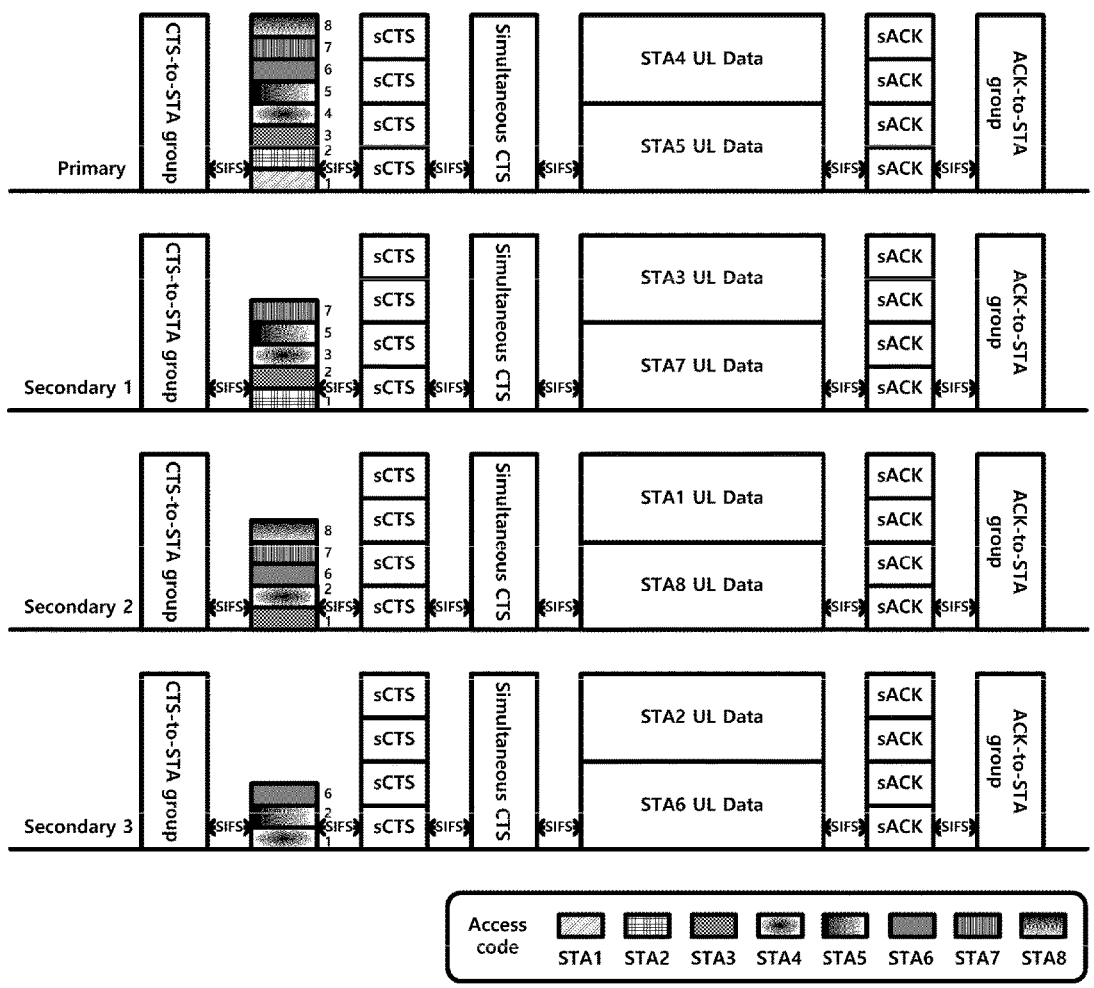
FIG. 12 is a view illustrating that a plurality of stations transmit data to an access point using random access according to another embodiment of the present invention.

FIG. 12 is a view illustrating that a plurality of stations transmit data to an access point using random access according to another embodiment of the present invention.

When the first wireless communication terminal transmits a frame indicating reception preparation, the second wireless communication terminal transmits a signal modulated using an orthogonal code to the first wireless communication terminal through all the channels detected as idle state. At this time, the first wireless communication terminal may arbitrarily select any one of a plurality of orthogonal codes included in the orthogonal code set. In another specific embodiment, a plurality of orthogonal codes may be allocated to the plurality of second wireless communication terminals, respectively.

In a specific embodiment, the first wireless communication terminal may signal a channel whose idle state should be determined by the second wireless communication terminal through a reception ready frame. Specifically, the first wireless communication terminal may signal a channel whose idle state should be determined by the second wireless communication terminal through a reception ready frame. For example, the RA of the reception ready frame may indicate a combination of channels whose idle state should be determined by the second wireless communication terminal. At this time, the second wireless communication terminal receives a reception ready frame and performs CCA only for the channel signaled by the reception ready frame. Therefore, the second wireless communication terminal normally may detect only the primary channel Primary Channel, and perform a clear channel assessment (CCA) only on the channel signaled by a reception ready frame when the reception ready frame is received. Through this, unnecessary channel detecting operation of the second wireless communication terminal may be reduced.

The first wireless communication terminal decodes a signal transmitted through each channel to extract an orthogonal code.

The first wireless communication terminal allocates resources to the plurality of second wireless communication terminals based on the extracted orthogonal code. Specifically, the first wireless communication terminal allocates a frequency band to the plurality of second wireless communication terminals based on the extracted orthogonal code. At this time, the first wireless communication terminal may allocate a frequency band smaller than the minimum unit frequency bandwidth to the second wireless communication terminal. At this time, the first wireless communication terminal may allocate a frequency band having a bandwidth of 5 MHz to the second wireless communication terminal.

The first wireless communication terminal transmits a resource allocation frame for signaling the resources allocated to each of the plurality of second wireless communication terminals. The first wireless communication terminal transmits the resource allocation frame through the frequency band allocated to the second wireless communication terminal. At this time, if the frequency band allocated to each of the plurality of second wireless communication terminals is smaller than the minimum unit frequency band, the first wireless communication terminal may transmit the resource allocation frame to the second wireless communication terminal through the frequency band having a frequency bandwidth smaller than the minimum unit frequency bandwidth. In a specific embodiment, the first wireless communication terminal may transmit a resource allocation frame to the second wireless communication terminal through a frequency band having a minimum frequency bandwidth allocable to the second wireless communication terminal. The minimum frequency bandwidth that the first wireless communication terminal is able to allocate to the second wireless communication terminal may be the smallest unit of the sub-carrier block.

The resource allocation frame may include information on the orthogonal code transmitted by the second wireless communication terminal allocated to the frequency band in which the resource allocation frame is transmitted. Specifically, the information on the orthogonal code may be an orthogonal code index indicating the orthogonal code.

When the orthogonal code is fixedly allocated to the second wireless communication terminal, the resource allocation frame may include an identifier for identifying the second wireless communication terminal allocated to the frequency band in which the resource allocation frame is transmitted. This is because, when the orthogonal code is fixedly allocated to the second wireless communication terminal, the first wireless communication terminal may identify the second wireless communication terminal that transmits the extracted orthogonal code. At this time, the identifier may be a MAC address of the second wireless communication terminal.

The second wireless communication terminal may extract the information on the orthogonal code or the identifier for identifying the second wireless communication terminal from the resource allocation frame to determine the frequency band allocated to the second wireless communication terminal.

The second wireless communication terminal may transmit a transmission notifying frame to the first wireless communication terminal. The second wireless communication terminal sets the NAV of a wireless communication terminal located in the wireless communication coverage of the second wireless communication terminal. At this time, the plurality of second wireless communication terminals may simultaneously transmit transmission notifying frames to the first wireless communication terminal as described above. At this time, the transmission notifying frame may be a simultaneous CTS frame.

The second wireless communication terminal transmits data to the first wireless communication terminal through the frequency band allocated to the second wireless communication terminal.

The first wireless communication terminal, which receives data, transmits a reception completion frame to the second wireless communication terminal that transmits the data. At this time, the first wireless communication terminal may transmit the reception completion frame to the second wireless communication terminal through the frequency band having the frequency bandwidth smaller than the minimum unit frequency bandwidth. In a specific embodiment, the first wireless communication terminal may transmit a reception completion frame to each of the plurality of second wireless communication terminals for each frequency band allocated to each of the plurality of second wireless communication terminals through OFDMA. At this time, the frequency band allocated to the second wireless communication terminal may be the minimum frequency bandwidth that the first wireless communication terminal is able to allocate to the second wireless communication terminal. Specifically, the minimum frequency bandwidth that the first wireless communication terminal is able to allocate to the second wireless communication terminal may be the smallest unit of the sub-carrier block.

Also, the first wireless communication terminal may transmit the reception completion frame for each minimum frequency bandwidth that the first wireless communication terminal is able to allocate to the second wireless communication terminal. In such a case, the reception completion frame may indicate that data is received through the frequency band in which the reception completion frame is transmitted.

However, when the first wireless communication terminal transmits a reception completion frame through the frequency band having the frequency bandwidth smaller than the minimum unit frequency bandwidth, a legacy wireless communication terminal that does not support an embodiment of the present invention may not receive the reception completion frame. Accordingly, this may cause an issue in the operation of the legacy wireless communication terminal. For example, in the 802.11 standard, a wireless communication terminal accesses a corresponding channel when the channel is idle during AIFS or DIFS. However, if an ACK frame indicating reception completion is not received at the time point when the NAV of the wireless communication terminal ends, the wireless communication terminal accesses the channel when the channel is idle during EIFS longer than DIFS. Therefore, when the first wireless communication terminal transmits a reception completion frame through a frequency band having a frequency bandwidth smaller than the minimum unit frequency bandwidth, a legacy wireless communication terminal waits for EIFS instead of DIFS during back-off. Accordingly, the legacy wireless communication terminal is more disadvantageous than the wireless communication terminal in contention-based access according to an embodiment of the present invention.

Therefore, when the first wireless communication terminal transmits the reception completion frame through the frequency band having the frequency bandwidth smaller than the minimum unit frequency bandwidth, the first wireless communication terminal may re-transmit the reception completion frame through the frequency band having the minimum unit frequency bandwidth. At this time, the first wireless communication terminal may transmit the reception completion frame in which the RA indicates the first wireless communication terminal. In another specific embodiment, the first wireless communication terminal may transmit a reception completion frame, which is a group address that the RA indicates a group including a plurality of second wireless communication terminals. At this time, the first wireless communication terminal may transmit a reception completion frame to the plurality of second wireless communication terminals for each minimum unit frequency bandwidth. Specifically, the first wireless communication terminal may transmit a reception completion frame for a plurality of second wireless communication terminals that receive the corresponding allocated minimum unit frequency bandwidth for each minimum frequency bandwidth. For example, it is assumed that a primary channel is allocated to a first station and a second station, and a first secondary channel is allocated to a third station and a fourth station. In such a case, the access point transmits a reception completion frame indicating reception completion for data transmitted by the first station and the second station through the primary channel, and transmits a reception completion frame indicating reception completion for data transmitted by the third station and the fourth station through the first secondary channel. Through such an operation, compatibility with a legacy wireless communication terminal that does not support a frequency bandwidth smaller than the minimum unit frequency bandwidth may be secured.

The specific operations of the first wireless communication terminal and the second wireless communication terminal will be described with reference to FIG. 12.

In the embodiment of FIG. 12, the access point AP transmits a CTS frame having the group address indicating the first station STA1 to the eighth station STA8 as an RA. Through this, the access point AP sets the NAV of a wireless communication terminal located in the wireless communication coverage of the access point AP.

The first station STA1 to the eighth station STA8 detect whether the channel is idle. As described above, the access point AP may signal a channel whose idle state should be detected by the first station STA1 to the eighth station STA8 through the RA value of the CTS frame. At this time, the first station STA1 to the eighth station STA8 may detect the idle state of the channel signaled by the CTS frame. In FIG. 12, the CTS frame signals the primary channel Primary, the first secondary channel Secondary 1, the second secondary channel Secondary 2, and the third secondary channel Secondary 3, and the first station STA1 to the eighth station STA8 perform a CCA on the primary channel Primary, the first secondary channel Secondary 1, the second secondary channel Secondary 2, and the third secondary channel Secondary 3.

The first station STA1 to the eighth station STA8 transmit signals to the access point AP using orthogonal codes through all channels detected as idle. The first station STA1 and the second station STA2 detect that the primary channel Primary, the first secondary channel Secondary 1, the second secondary channel Secondary 2, and the third secondary channel Secondary 3 are idle. Therefore, the first station STA1 and the second station STA2 transmit orthogonal codes to the access point AP through the primary channel Primary, the first secondary channel Secondary 1, the second secondary channel Secondary 2, and the third secondary channel Secondary 3. The third station STA3 detects that the primary channel Primary and the first secondary channel Secondary 1 are idle. Therefore, the third station STA3 transmits orthogonal codes to the access point AP through the primary channel Primary and the first secondary channel Secondary 1. The fourth station STA4 detects that the primary channel Primary is idle. Therefore, the third station STA3 transmits orthogonal codes to the access point AP through the primary channel Primary. The fifth station STA5 detects that the primary channel Primary and the first secondary channel Secondary 1 are idle. Therefore, the fifth station STA5 transmits orthogonal codes to the access point AP through the primary channel Primary and the first secondary channel Secondary 1. The sixth station STA6 detects that the primary channel Primary, the second secondary channel Secondary 2, and the third secondary channel Secondary 3 are idle. Therefore, the sixth station STA6 transmits orthogonal codes to the access point AP through the primary channel Primary, the second secondary channel Secondary 2, and the third secondary channel Secondary 3. The seventh station STA7 detects that the primary channel Primary, the first secondary channel Secondary 1, and the second secondary channel Secondary 2 are idle. The seventh station STA7 transmits orthogonal codes to the access point AP through the primary channel Primary, the first secondary channel Secondary 1, and the second secondary channel Secondary 2. The eighth station STA8 detects that the primary channel Primary and the second secondary channel Secondary 2 are idle. The eighth station STA8 transmits orthogonal codes to the access point AP through the primary channel Primary and the second secondary channel Secondary 2.

At this time, the orthogonal codes of the first station STA1 to the eighth station STA8 are all different. Also, as described above, each of the first station STA1 to the eighth station STA8 may arbitrarily select any one orthogonal code from orthogonal code set including a plurality of orthogonal codes. In another specific embodiment, a plurality of orthogonal codes may be allocated to the first station STA1 to the eighth station STA8, respectively.

The access point AP extracts an orthogonal code from the transmitted signal.

The access point AP allocates a resource to each of the first station STA1 and the second station STA2 based on the extracted orthogonal code.

The access point AP transmits an sCTS frame for signaling resources allocated to each of the first station STA1 to the eighth station STA8. In a specific embodiment, the first wireless communication terminal may transmit a resource allocation frame to the second wireless communication terminal through a frequency band having a minimum frequency bandwidth allocable to the second wireless communication terminal. The minimum frequency bandwidth that the first wireless communication terminal is able to allocate to the second wireless communication terminal may be the smallest unit of the sub-carrier block.

The first station STA1 to the eighth station STA8 extract information on the orthogonal code or identifiers for identifying the first station STA1 to the eighth station STA8 from the sCTS frame to determine a frequency band allocated to each of the first station STA1 to the eighth station STA8.

Each of the first station STA1 to the eighth station STA8 transmits a simultaneous CTS frame to the first wireless communication terminal. The first station STA1 to the eighth station STA8 set the NAV of a wireless communication terminal located in the wireless communication coverage of the first station STA1 to the eighth station STA8. The first station STA1 to the eighth station STA8 transmit data through a frequency band having a minimum unit frequency bandwidth.

Each of the first station STA1 to the eighth station STA8 transmits data to the first wireless communication terminal through a frequency band allocated to each of the first station STA1 to the eighth station STA8.

The access point AP transmits an sACK frame indicating reception completion to each of the first station STA1 to the eighth station STA8 through the frequency band having the minimum frequency bandwidth allocable to each of the first station STA1 to the eighth station STA8.

The access point AP transmits an ACK frame through a frequency band having a minimum unit frequency bandwidth. At this time, the access point AP may transmit an ACK frame in which the RA indicates the access point AP. In another specific embodiment, an access point AP may transmit an ACK frame, which is a group address that the RA indicates a group including a plurality of stations. In a specific embodiment, the access point AP may transmit an ACK frame for the fourth station STA4 and the fifth station STA5 through the primary channel Primary. Also, the access point AP may transmit an ACK frame for the third station STA3 and the seventh station STAT through the first secondary channel Secondary 1. Also, the access point AP may transmit an ACK frame for the first station STA1 and the eighth station STA8 through the second secondary channel Secondary 2. Also, the access point AP may transmit an ACK frame for the second station STA2 and the sixth station STA6 through the third secondary channel Secondary 3.

Figure 13:
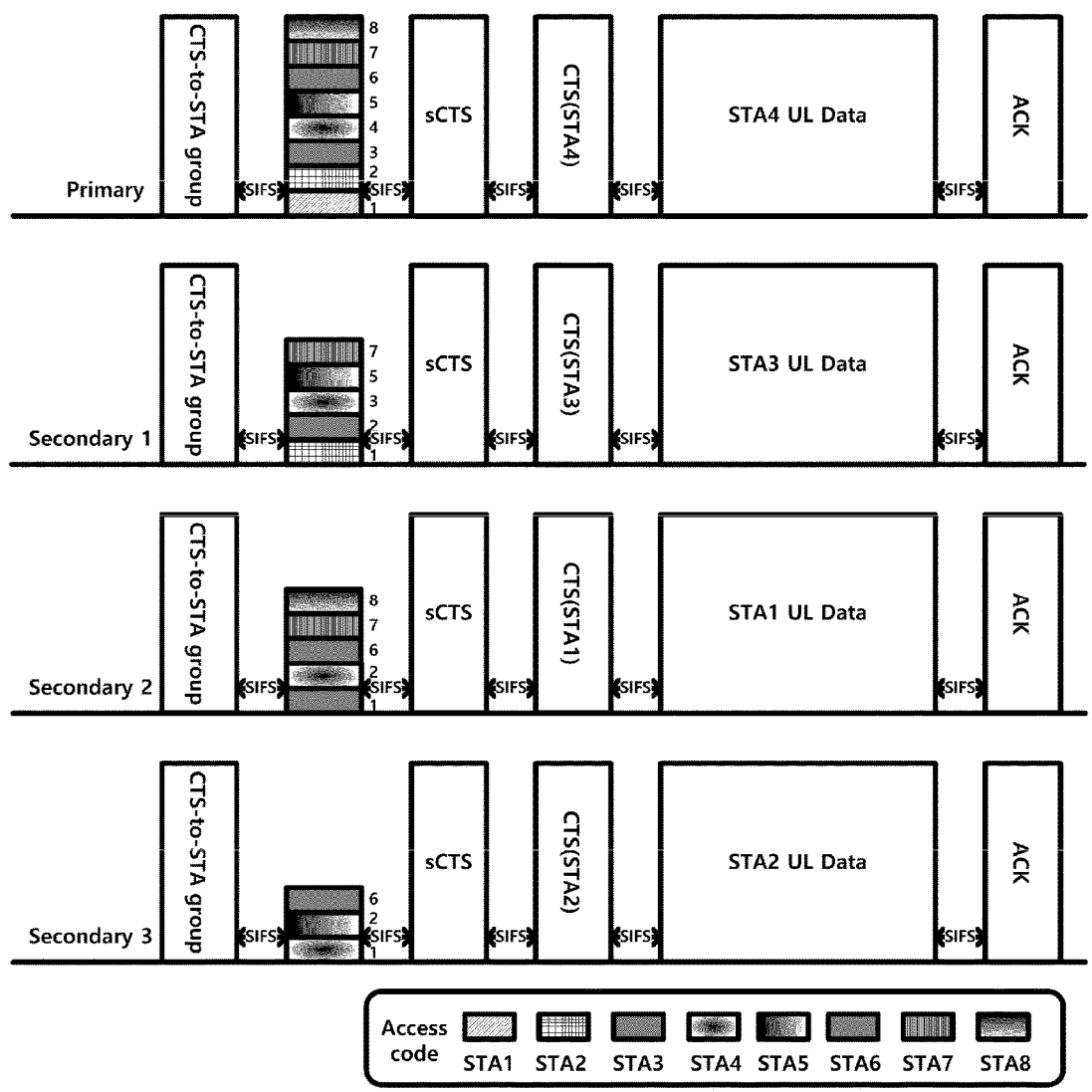
FIG. 13 is a view illustrating that when a plurality of stations according to another embodiment of the present invention transmit data to an access point using a random access, a frequency band having a minimum unit frequency bandwidth is allocated to the plurality of stations.

FIG. 13 is a view illustrating that when a plurality of stations according to another embodiment of the present invention transmit data to an access point using a random access, a frequency band having a minimum unit frequency bandwidth is allocated to the plurality of stations.

When the first wireless communication terminal allocates a frequency band to the plurality of second wireless communication terminals in a unit of the minimum frequency bandwidth, the first wireless communication terminal may transmit a resource allocation frame to each of the plurality of second wireless communication terminals.

In addition, when the first wireless communication terminal allocates a frequency band to the plurality of second wireless communication terminals in a unit of the minimum frequency bandwidth, the first wireless communication terminal may transmit a reception completion frame to each of the plurality of second wireless communication terminals. When the first wireless communication terminal transmits the reception completion frame through the frequency band having the minimum unit frequency bandwidth, a legacy wireless communication terminal supporting only the minimum unit frequency bandwidth or more may receive the reception completion frame. Therefore, the first wireless communication terminal does not need to transmit the reception completion frame again.

However, as described above, the first wireless communication terminal may transmit a reception completion frame to each of the plurality of second wireless communication terminals for each frequency band allocated to each of the plurality of second wireless communication terminals through OFDMA. In such a case, the first wireless communication terminal may transmit one physical frame transmitted through a frequency bandwidth greater than the minimum unit frequency bandwidth. At this time, the first wireless communication terminal may transmit the reception completion frame for any one second wireless communication terminal by the minimum unit frequency bandwidth through the lower physical frame. In such a case, the legacy wireless communication terminal may not receive the reception completion frame.

The specific operations of the first wireless communication terminal and the second wireless communication terminal will be described with reference to FIG. 13.

In the embodiment of FIG. 13, operations until the first station STA1 to the fourth station STA4 transmit orthogonal codes to the access point AP are the same as those of the embodiment of FIG. 12. However, the access point AP allocates a frequency band having a minimum unit frequency bandwidth to each of the first station STA1 to the fourth station STA4.

Therefore, the access point AP transmits an sCTS frame for signaling a resource allocation to each of the first station STA1 to the fourth station STA4 through the frequency band having the minimum unit frequency bandwidth.

Each of the first station STA1 to the fourth station STA4 transmits data to the access point AP through an allocated frequency band.

The access point AP transmits data to the first station STA1 to the fourth station STA4 through the frequency band allocated to each of the first station STA1 to the fourth station STA4.

Figure 14:
FIG. 14 is a view illustrating that when a plurality of stations according to another embodiment transmit data to an access point using a random access, any one station among a plurality of stations that receive any one channel does not transmit a transmission notifying frame.

FIG. 14 is a view illustrating that when a plurality of stations according to another embodiment transmit data to an access point using a random access, any one of a plurality of stations receiving any one allocated channel is not able to transmit a transmission notifying frame.

As described above, the plurality of second wireless communication terminals may simultaneously transmit the transmission notifying frame including the same format and the same contents. In such a case, even if the first wireless communication terminal receives the transmission notifying frame, the first wireless communication terminal may not know which second wireless communication terminal transmits the transmission notifying frame. Therefore, even if any one wireless communication terminal that does not receive an allocated sub-frequency band included in the same frequency band does not transmit the transmission notifying frame, the first wireless communication terminal may not take a separate action. This will be described in detail with reference to FIG. 14.

In the embodiment of FIG. 14, the seventh station STA7 and the third station STA3 receive the allocated first secondary channel Secondary 1. However, the frequency band allocated to the seventh station STA7 is being used by another wireless communication terminal before the seventh station STA transmits the transmission notifying frame. Therefore, the seventh station STAT may not transmit the transmission notifying frame. The operations of the first station STA1 to the sixth station STA6, the eighth STAB, and the access point AP are the same as those of the embodiment described with reference to FIG. 12.

However, if all of the second wireless communication terminals that receive an allocated sub-frequency band included in any one frequency band (channel) are not able to transmit a transmission notifying frame, the first wireless communication terminal determine that the corresponding frequency band cannot be used. Accordingly, the first wireless communication terminal may perform additional operations thereon. This will be described with reference to FIG. 15.

Figure 15:
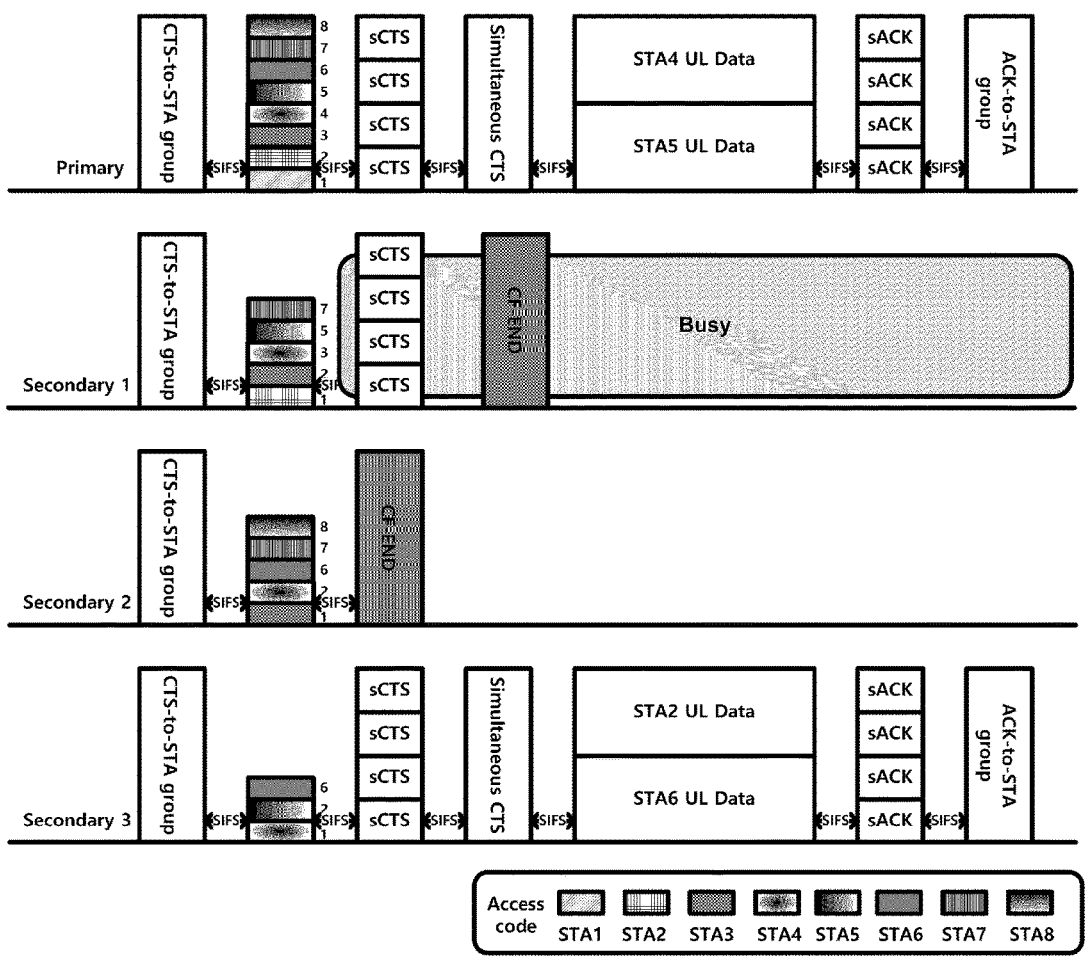
FIG. 15 is a view illustrating that when a plurality of stations according to another embodiment transmit data to an access point using a random access, all of a plurality of stations that receive any one channel do not transmit a transmission notifying frame.

FIG. 15 is a view illustrating that when a plurality of stations according to another embodiment transmit data to an access point using a random access, all of a plurality of stations receiving any one allocated channel are not able to transmit a transmission notifying frame.

If there is a frequency band in which the first wireless communication terminal does not receive the transmission notifying frame, the first wireless communication terminal may reset the NAV set in the corresponding frequency band. Specifically, if there is a frequency band in which the first wireless communication terminal does not receive the transmission notifying frame, the first wireless communication terminal may transmit the NAV reset frame indicating that the NAV set in the frequency band in which the frame is transmitted through the corresponding frequency band. Specifically, if all of the second wireless communication terminals to which sub-frequency bands included in any one frequency band are not allocated, are not able to transmit the transmission notifying frame, the first wireless communication terminal may transmit the NAV reset frame through the corresponding frequency band.

In addition, when there is a frequency band not allocated to the second wireless communication terminal, the first wireless communication terminal may reset the NAV set in the corresponding frequency band. Specifically, when there is a frequency band that is not allocated to the second wireless communication terminal, the first wireless communication terminal may transmit the NAV reset frame through the corresponding frequency band.

In a specific embodiment, the NAV reset frame indicating the resetting of the NAV set in the frequency band in which the frame is transmitted may be a CF-END frame.

The specific operations of the first wireless communication terminal and the second wireless communication terminal will be described with reference to FIG. 15.

In the embodiment of FIG. 15, the access point AP allocates frequency bands to the second station STA2 to the seventh station STA7. Specifically, the access point AP allocates the primary channel Primary to the fourth station STA4 and the fifth station STA5, allocates the first secondary channel Secondary 1 to the third station STA3 and the seventh station STA7, and allocates the third secondary channel Secondary 3 to the second station STA2 and the sixth station STA6.

The access point AP transmits the CF-END frame to the second secondary channel Secondary 2 that is not allocated to any station. Through this, the access point AP resets the NAV for the second secondary channel Secondary 2 set to a wireless communication terminal located in the wireless communication coverage of the access point AP by a CTS-to-STA group frame indicating reception preparation.

The access point AP does not receive any Simulated CTS frame through the first secondary channel Secondary 1.

Therefore, the access point AP transmits the CF-END frame to the first secondary channel Secondary 1. Through this, the access point AP resets the NAV for the first secondary channel Secondary 1 set to a wireless communication terminal located in the wireless communication coverage of the access point AP by a CTS-to-STA group frame indicating reception preparation.

The other operations of the access point AP, the second station STA2, and the fourth station STA4 to the sixth station STA6 are the same as those of the embodiment of FIG. 12.

Through such an operation, the first wireless communication terminal may quickly return an unused frequency band to another wireless communication terminal.

Through the operations of the first wireless communication terminal and the second wireless communication terminal described with reference to FIGS. 10 to 15, the first wireless communication terminal may allocate resources to the plurality of second wireless communication terminals in consideration of the state of the channel located outside the wireless communication coverage of the first wireless communication terminal. In addition, it is possible to quickly return the frequency band not used by the first wireless communication terminal, thereby enhancing coexistence efficiency with other BSSs.

As described above, in order for the plurality of second wireless communication terminals to transmit data to the first wireless communication terminal, the first wireless communication terminal allocates a resource including a frequency band to each of the plurality of second wireless communication terminals. Then, the first wireless communication terminal should signal the frequency band allocated to each of the plurality of second wireless communication terminals. A method for signaling the frequency band allocated to each of the plurality of second wireless communication terminals will be described with reference to FIGS. 16 to 18.

Figure 16:
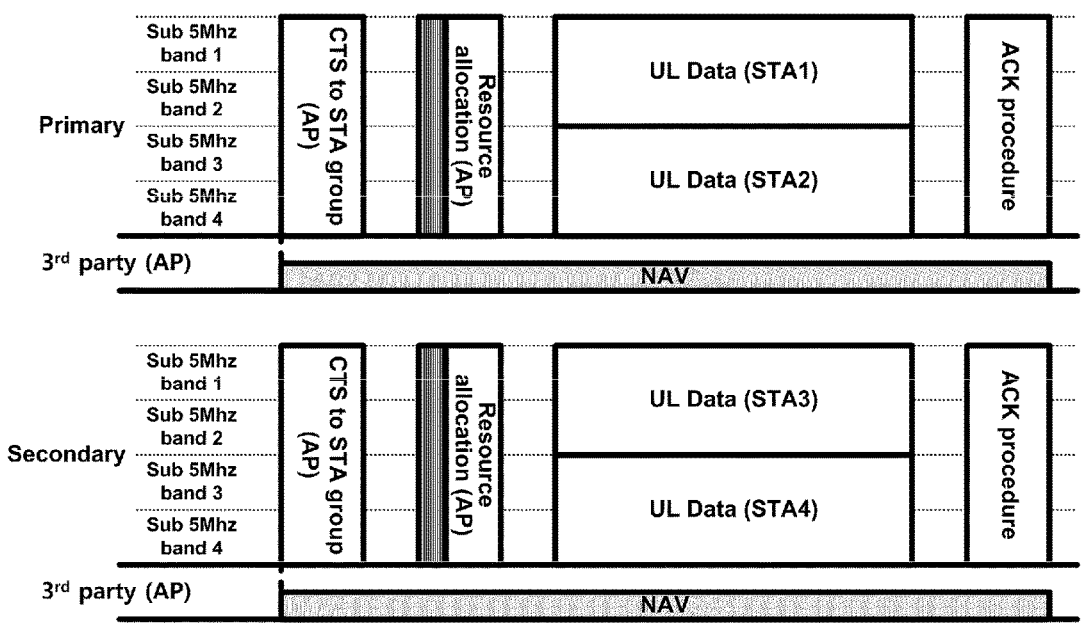
FIG. 16 is a view illustrating that an access point transmits a frame indicating a resource allocation according to an embodiment of the present invention.

FIG. 16 is a view illustrating that an access point transmits a frame indicating a resource allocation according to an embodiment of the present invention.

The first wireless communication terminal may transmit a reception ready frame and then transmit a resource allocation frame after a predetermined time. At this time, the predetermined time may be SIFS defined in the 802.11 standard.

The reception ready frame may be in a format supported by a legacy wireless communication terminal that does not support an embodiment of the present invention. This is because the reception ready frame is for setting the NAV of the legacy wireless communication terminal as well as a wireless communication terminal supporting an embodiment of the present invention. In addition, the resource allocation frame may be in a format not supported by the legacy wireless communication terminal. Specifically, the first wireless communication terminal may use a higher MCS than the transmission of the reception ready frame in order for transmission of the resource allocation frame. This is because the legacy wireless communication terminal does not affect the data transmission of the second wireless communication terminal even if the legacy wireless communication terminal can not receive the resource allocation frame. Through this, it is possible to reduce the time required for transmission of resource allocation frames.

The first wireless communication terminal may signal information on resources allocated to each of the plurality of second wireless communication terminals through a preamble of a physical frame including a resource allocation frame, a MAC header of a resource allocation frame, and a payload of a resource allocation frame. Specifically, the signaling field of the physical frame including the resource allocation frame may indicate hierarchical information on the granularity of the frequency bandwidth. In addition, the signaling field of the physical frame including the resource allocation frame may indicate a group identifier for identifying a group including a plurality of second wireless communication terminals that are to transmit data through a group address field indicating a group address. At this time, the signaling field may be an HE-SIG field, which is a signaling field for a wireless communication terminal supporting an embodiment of the present invention. Specifically, the signaling field may be an HE-SIG A field for signaling information commonly applied to a plurality of second wireless communication terminals.

Also, the first wireless communication terminal may signal an identifier for identifying the second wireless communication terminal and the bandwidth of the frequency band allocated to the second wireless communication terminal through at least one of the MAC header, the payload, and the HE-SIG B field of the resource allocation frame. At this time, the HE-SIG B field is a signaling field of a physical frame for signaling information applied to each of the plurality of second wireless communication terminals.

According to a specific embodiment, the first wireless communication terminal may signal all information of the resource allocation for the second wireless communication through the preamble of the physical frame including the resource allocation frame.

Accordingly, the second wireless communication terminal may obtain information on resources allocated to each of the plurality of second wireless communication terminals through a preamble of a physical frame including a resource allocation frame, a MAC header of a resource allocation frame, and a payload of a resource allocation frame. Specifically, the second wireless communication terminal may obtain an identifier for identifying the second wireless communication terminal and information on the bandwidth of the frequency band allocated to the second wireless communication terminal through at least one of the MAC header, the payload, and the HE-SIG B field of the resource allocation frame. Also, according to a specific embodiment, the second wireless communication terminal may obtain all the information of the resource allocation for the second wireless communication through the preamble of the physical frame.

In a specific embodiment, the second wireless communication terminal may transmit the channel state detected by the second wireless communication terminal to the first wireless communication terminal as described above. Specifically, the second wireless communication terminal may transmit the channel state detected by the second wireless communication terminal to the first wireless communication terminal using the orthogonal code as described above.

In a specific embodiment, after receiving the resource allocation frame, the second wireless communication terminal may transmit the transmission notifying frame of the second wireless communication terminal. Through this, the second wireless communication terminal may set the NAV of a wireless communication terminal located in the wireless communication coverage of the second wireless communication terminal.

In another specific embodiment, the second wireless communication terminal may not transmit the transmission notifying frame of the second wireless communication terminal. In such a case, the time required for the second wireless communication terminal to transmit the reception ready frame may be saved. However, there is a risk that wireless communication terminals located outside the wireless communication coverage of the first wireless communication terminal and within the wireless communication coverage of the second wireless communication terminal may access the frequency band used by the second wireless communication terminal.

The specific operations of the first wireless communication terminal and the second wireless communication terminal will be described with reference to FIG. 16.

In the embodiment of FIG. 16, the access point AP transmits a CTS frame indicating reception preparation. At this time, the RA of the CTS frame may be a group address indicating a plurality of second wireless communication terminals. Through this, the access point AP sets the NAV of a wireless communication terminal located in the wireless communication coverage of the access point AP.

The access point AP transmits a resource allocation frame to the plurality of second wireless communication terminals. Specifically, the access point AP transmits a resource allocation frame after a predetermined time from transmission of the CTS frame. The structure of the resource allocation frame may be the same as one described above.

The first station STA1 to the fourth station STA4 obtain information on a frequency band allocated to each of the first station STA1 and the fourth station STA4 based on the resource allocation frame.

The first station STA1 to the fourth station STA4 transmit data through a frequency band allocated to each of the first station STA1 and the fourth station STA4.

The access point AP transmits an ACK frame to the first station STA1 to the fourth station STA4. The access point AP may transmit an ACK frame to the first station STA1 to the fourth station STA4 through various embodiments including the above-described embodiment.

In the embodiment of FIG. 16, the first wireless communication terminal transmits a reception ready frame and then transmits a resource allocation frame after a predetermined time. In such a case, it takes a considerable time for the first wireless communication terminal to transmit the resource allocation frame. Therefore, there is a need for a method for reducing the time required for the first wireless communication terminal to transmit a resource allocation frame. This will be described with reference to FIGS. 17 and 18.

Figure 17:
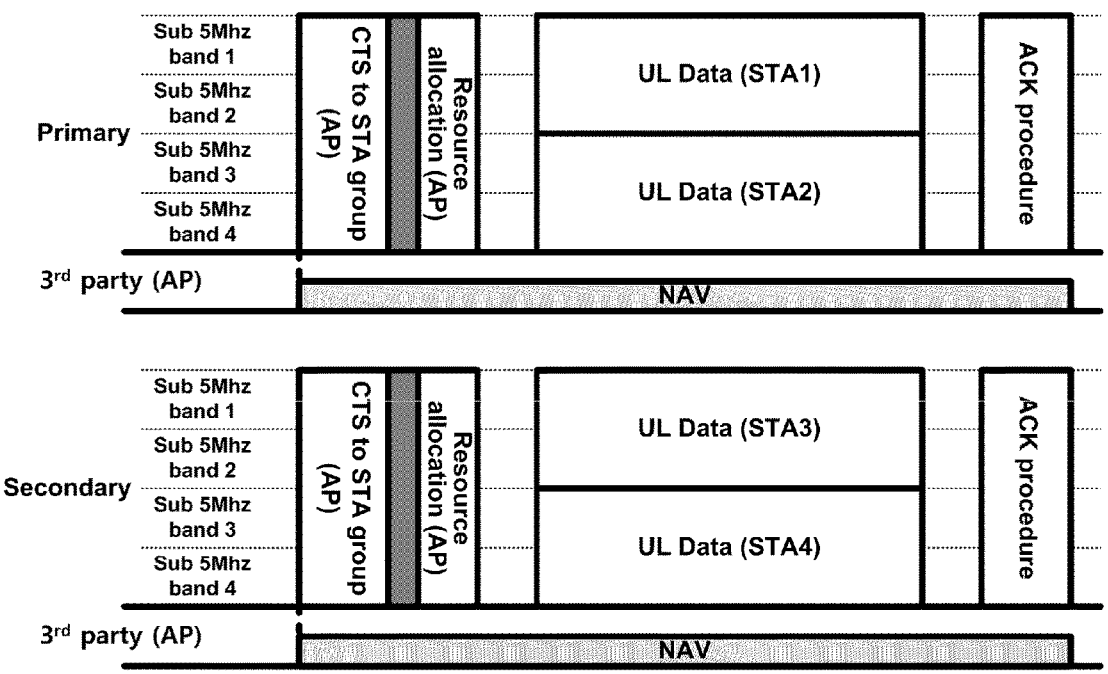
FIG. 17 is a view illustrating that an access point according to another embodiment of the present invention transmits a reception ready frame and a frame indicating resource allocation without time interval.

FIG. 17 is a view illustrating that an access point according to another embodiment of the present invention transmits a reception ready frame and a frame indicating resource allocation without time interval.

The first wireless communication terminal may transmit a reception ready frame and transmit a resource allocation frame without a time interval. Specifically, the first wireless communication terminal may transmit the reception ready frame immediately after the FCS field of the reception ready frame. At this time, the FCS field indicates whether the frame includes error data.

In such a case, a wireless communication terminal that does not support an embodiment of the present invention decodes the Frame Check Sequence (FCS) field of the reception ready frame, and enters a waiting state. The second wireless communication terminal supporting an embodiment of the present invention decodes the FCS field of the reception ready frame and then receives the resource allocation frame. At this time, the second wireless communication terminal supporting the embodiment of the present invention may determine whether the resource allocation frame is transmitted immediately after the FCS field of the reception ready frame through the RA of the reception ready frame. For example, when the group address indicating the plurality of second wireless communication terminals is the RA of the reception ready frame, the second wireless communication terminal may determine that the resource allocation frame is transmitted immediately after the FCS field of the reception ready frame.

In a specific embodiment, the second wireless communication terminal may transmit the channel state detected by the second wireless communication terminal to the first wireless communication terminal as described above. Specifically, the second wireless communication terminal may transmit the channel state detected by the second wireless communication terminal to the first wireless communication terminal using the orthogonal code as described above.

In a specific embodiment, after receiving the resource allocation frame, the second wireless communication terminal may transmit the transmission notifying frame of the second wireless communication terminal. Through this, the second wireless communication terminal may set the NAV of a wireless communication terminal located in the wireless communication coverage of the second wireless communication terminal.

In another specific embodiment, the second wireless communication terminal may not transmit the transmission notifying frame of the second wireless communication terminal. In such a case, the time required for the second wireless communication terminal to transmit the reception ready frame may be saved. However, there is a risk that wireless communication terminals located outside the wireless communication coverage of the first wireless communication terminal and within the wireless communication coverage of the second wireless communication terminal may access the frequency band used by the second wireless communication terminal.

The specific operations of the first wireless communication terminal and the second wireless communication terminal will be described with reference to FIG. 17.

In the embodiment of FIG. 17, the access point AP transmits a CTS frame and then immediately transmits a resource allocation frame. The structure of the resource allocation frame may be the same as one described above.

The first station STA1 to the fourth station STA4 obtain information on a frequency band allocated to each of the first station STA1 and the fourth station STA4 based on the resource allocation frame.

The first station STA1 to the fourth station STA4 transmit data through a frequency band allocated to each of the first station STA1 and the fourth station STA4.

The access point AP transmits an ACK frame to the first station STA1 to the fourth station STA4. The access point AP may transmit an ACK frame to the first station STA1 to the fourth station STA4 through various embodiments including the above-described embodiment.

Figure 18:
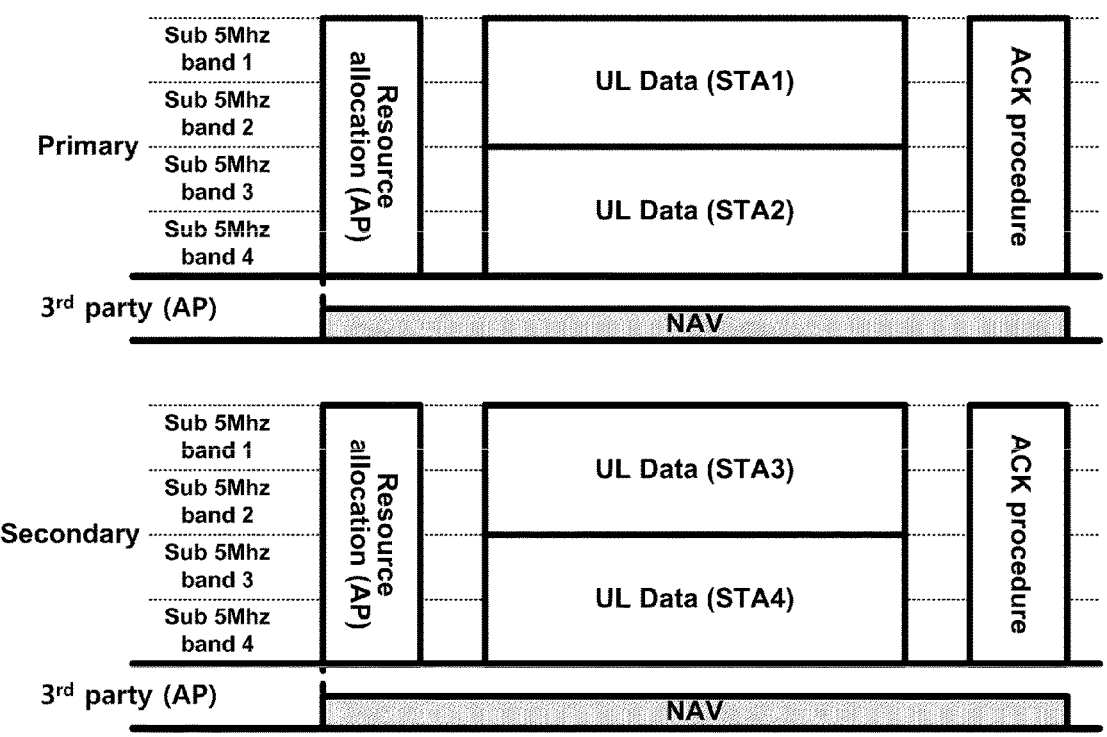
FIG. 18 is a view illustrating that an access point according to another embodiment of the present invention transmits one frame in which a transmission notifying frame and a frame indicating resource allocation are integrated.

FIG. 18 is a view illustrating that an access point according to another embodiment of the present invention transmits one frame where a transmission notifying frame and a resource allocation frame are integrated.

The first wireless communication terminal may indicate that the first wireless communication terminal is ready to receive data and may transmit an integrated frame for signaling resources allocated to each of the plurality of second wireless communication terminals.

At this time, the RA of the integrated frame may be a group address indicating a plurality of second wireless communication terminals.

Since the integrated frame indicates that the first wireless communication terminal is ready to receive data, a legacy wireless communication terminal that does not support an embodiment of the present invention should be able to receive the integrated frame and set the NAV. For this, the integrated frame may include information on resource allocation for each of the plurality of second wireless communication terminals, in the extension form of an MAC header. In another specific embodiment, the integrated frame may include information on resource allocation for each of the plurality of second wireless communication terminals, in the payload form of a frame. In another specific embodiment, the integrated frame may include information on resource allocation for each of the plurality of second wireless communication terminals, in the extension field form following the FCS field.

The second wireless communication terminal obtains information on a resource allocated to the second wireless communication terminal based on the integrated frame.

In addition, a wireless communication terminal that receives the integrated frame sets the NAV regardless of whether it is a legacy wireless communication terminal and a wireless communication terminal supporting an embodiment of the present invention.

In a specific embodiment, the second wireless communication terminal may transmit the channel state detected by the second wireless communication terminal to the first wireless communication terminal as described above. Specifically, the second wireless communication terminal may transmit the channel state detected by the second wireless communication terminal to the first wireless communication terminal using the orthogonal code as described above.

In a specific embodiment, after receiving the resource allocation frame, the second wireless communication terminal may transmit the transmission notifying frame of the second wireless communication terminal. Through this, the second wireless communication terminal may set the NAV of a wireless communication terminal located in the wireless communication coverage of the second wireless communication terminal.

In another specific embodiment, the second wireless communication terminal may not transmit the transmission notifying frame of the second wireless communication terminal. In such a case, the time required for the second wireless communication terminal to transmit the reception ready frame may be saved. However, there is a risk that wireless communication terminals located outside the wireless communication coverage of the first wireless communication terminal and within the wireless communication coverage of the second wireless communication terminal may access the frequency band used by the second wireless communication terminal.

The specific operations of the first wireless communication terminal and the second wireless communication terminal will be described with reference to FIG. 18.

In the embodiment of FIG. 18, the access point AP transmits the above-mentioned integrated frame. Through this, a wireless communication terminal located in the wireless communication coverage of the access point AP sets an NAV. The structure of the integrated frame may be the same as one described above.

The first station STA1 to the fourth station STA4 obtain information on allocated frequency bands based on the integrated frame.

The first station STA1 to the fourth station STA4 transmit data through an allocated frequency band.

The access point AP transmits an ACK frame to the first station STA1 to the fourth station STA4. The access point AP may transmit an ACK frame to the first station STA1 to the fourth station STA4 through various embodiments including the above-described embodiment.

It is described with reference to FIGS. 19 and 20 that the first wireless communication terminal transmits a reception completion frame to the plurality of second wireless communication terminals.

Figure 19:
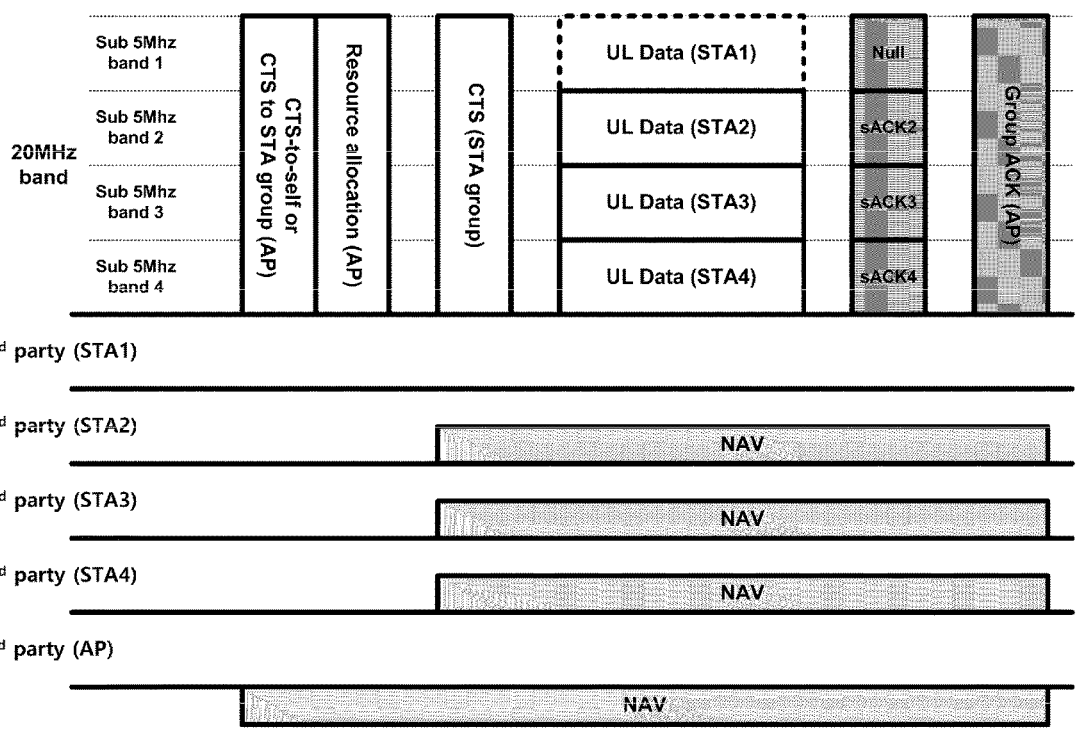
FIG. 19 is a view illustrating that when not receiving data through any one sub-frequency band, an access point transmits an ACK frame according to another embodiment of the present invention.

FIG. 19 is a view illustrating that when not receiving data through any one sub-frequency band, an access point transmits an ACK frame according to another embodiment of the present invention.

As described above, the first wireless communication terminal may receive data and transmit a reception completion frame to each of the plurality of second wireless communication terminals that transmit the data. Specifically, the first wireless communication terminal may transmit a reception completion frame to the second wireless communication terminal through a frequency band having a minimum frequency bandwidth allocable to the second wireless communication terminal. The minimum frequency bandwidth that the first wireless communication terminal is able to allocate to the second wireless communication terminal may be the smallest unit of the sub-carrier block.

In such a case, the first wireless communication terminal may transmit transmission completion frames to the plurality of wireless communication terminals at once. However, for compatibility with a legacy wireless communication terminal, the first wireless communication terminal may transmit the reception completion frame again through the frequency band having more than the minimum unit frequency bandwidth. At this time, the RA of the reception completion frame may be a group address indicating a plurality of second wireless communication terminals. In another specific embodiment, the RA of the reception completion frame may be the address of the first wireless communication terminal.

Also, the first wireless communication terminal may transmit the reception completion frame only through the frequency band in which the data is transmitted. The first wireless communication terminal may not transmit the reception completion frame in the frequency-band where no data is transmitted.

The specific operations of the first wireless communication terminal and the second wireless communication terminal will be described with reference to FIG. 19.

In the embodiment of FIG. 19, the access point AP allocates a resource to each of the first station STA1 to the fourth station STA4.

The access point AP transmits a CTS frame having the group address indicating the first station STA1 to the second station STA4 as an RA. Through this, the access point AP sets the NAV of a wireless communication terminal located in the wireless communication coverage of the access point AP.

The access point AP transmits a resource allocation frame for signaling a resource allocated to each of the first station STA1 to the second station STA4.

Each of the first station STA1 to the fourth station STA4 obtains information on a resource allocated to each of the first station STA1 to the fourth station STA4 based on the resource allocation frame.

The first station STA1 to the fourth station STA4 transmit to the access point AP a CTS frame for notifying that the data is to be transmitted simultaneously. As described above, the transmission address of the CTS frame may be a group address indicating a group including the first station STA2 to the fourth station STA4. Through this, the first station STA1 to the fourth station STA4 set the NAV of a wireless communication terminal located in the wireless coverage of the first station STA1 to the fourth station STA4.

The second station STA2 to the fourth station STA4 transmit data to the access point AP through a resource allocated to each.

The access point AP receives data from the second station STA2 to the fourth station STA4 through the resources allocated to the second station STA2 to the fourth station STA4, respectively.

The access point AP transmits an ACK frame indicating completion of reception to each of the second station STA2 to the fourth station STA4 through the channel allocated to each of the second station STA2 to the fourth station STA4. At this time, since the access point AP does not receive data from the first station STA1, the access point AP does not transmit an ACK frame through the channel allocated to the first station STA1.

The access point AP transmits an ACK frame having a group address indicating the group including the second station to the fourth station as an RA through the entire channel having the minimum unit frequency bandwidth.

Through such an embodiment, the first wireless communication terminal may reduce the time required for transmission of the reception completion frame. However, in such a case, for compatibility with a legacy wireless communication terminal, the transmission completion frame should be transmitted again through the frequency band having the minimum frequency unit bandwidth.

A reception completion frame indicating whether reception of data transmitted by a plurality of second wireless communication terminals is completed will be described with reference to FIG. 20.

Figure 20:
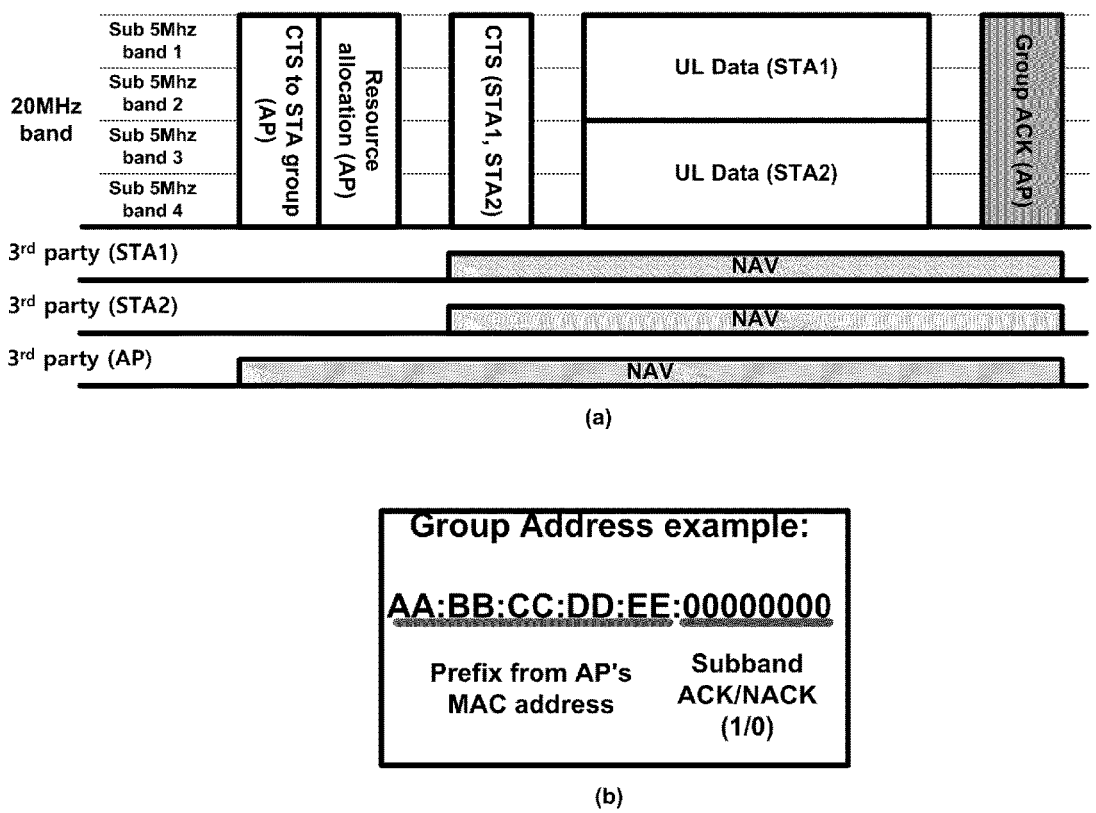
FIG. 20 is a view illustrating that an access point according to another embodiment of the present invention transmits an ACK frame and illustrating the syntax of the ACK frame.

FIG. 20 is a view illustrating that an access point according to another embodiment of the present invention transmits an ACK frame and illustrating the syntax of the ACK frame.

The first wireless communication terminal may transmit a multi-terminal reception completion frame indicating whether reception of data transmitted by the plurality of second wireless communication terminals is completed.

Specifically, the first wireless communication terminal may simultaneously transmit a plurality of different multi-terminal reception completion frames for each minimum unit frequency bandwidth. In a specific embodiment, the first wireless communication terminal may simultaneously transmit a plurality of multi-terminal reception completion frames through OFDMA. At this time, the first wireless communication terminal may transmit a multi-terminal reception completion frame through a wireless frequency band allocated to the plurality of second wireless communication terminals that are to receive the corresponding multi-terminal reception completion frame. For example, the first wireless communication terminal may transmit the first multi-terminal reception completion frame and the second multi-terminal reception completion frame as one physical frame through OFDMA. At this time, the first wireless communication terminal may transmit a first multi-terminal reception completion frame to the second wireless communication terminal of the first group through the frequency band allocated to the second wireless communication terminal of the first group. Here, the first group represents a plurality of second wireless communication terminals that are to receive the first multi-terminal reception completion frame. In addition, the first wireless communication terminal may transmit a second multi-terminal reception completion frame to the second wireless communication terminal of the second group through the frequency band allocated to the second wireless communication terminal of the second group. Here, the second group represents a plurality of second wireless communication terminals that are to receive the second multi-terminal reception completion frame.

In another specific embodiment, the first wireless communication terminal may consider compatibility with a legacy wireless communication terminal that does not support an embodiment of the present invention when transmitting a reception completion frame. Accordingly, the multi-terminal reception completion frame may be the same as the transmission complete frame format supported by the legacy communication terminal. In addition, the first wireless communication terminal may transmit a multi-terminal reception completion frame through a frequency band having a minimum unit frequency bandwidth.

The multi-terminal reception completion frame may include an identifier for identifying a plurality of second wireless communication terminals. At this time, the identifier for identifying the plurality of second wireless communication terminals may be a group address indicating a group including a plurality of second wireless communication terminals. In a specific embodiment, the RA of the multi-terminal reception completion frame may be a group address indicating a group including a plurality of second wireless communication terminals.

The multi-terminal reception completion frame may indicate that there is data not received. Specifically, the multi-terminal reception completion frame may include a bit value indicating that there is data not received. In a specific embodiment, the multi-terminal reception completion frame may indicate that data transmitted by any one second wireless communication terminal is not received. In another specific embodiment, the multi-terminal reception completion frame may indicate whether data reception is completed for each sub-frequency band of the frequency band in which the multi-terminal reception completion frame is transmitted. Specifically, a field value indicating the RA of the multi-terminal reception completion frame may indicate whether the data reception is completed for each sub-frequency band of the frequency band in which the multi-terminal reception completion frame is transmitted. For example, the address field of the multi-terminal reception completion frame may be a 6-byte field. At this time, a 5-byte field may be a group address indicating a group including a plurality of second wireless communication terminals. Each of the eight bits included in the remaining one byte may indicate whether data received through each sub-frequency band is received. For example, if the value of the bit is 1, it may indicate that the first wireless communication terminal completely receives the data transmitted through the corresponding sub-frequency band. If the value of the bit is 0, it may indicate that the first wireless communication terminal does not completely receive the data transmitted through the corresponding sub-frequency band.

Accordingly, the first wireless communication terminal sets the field value of the multi-terminal reception completion frame according to whether data is received or not.

The second wireless communication terminal determines whether the first wireless communication terminal receives the data based on the field value of the multi-terminal reception completion frame.

The specific operations of the first wireless communication terminal and the second wireless communication terminal will be described with reference to FIG. 20.

In the embodiment of FIG. 20, the access point AP allocates a resource to each of the first station STA1 and the second station STA2.

The access point AP transmits a CTS frame having the group address indicating the first station STA1 and the second station STA2 as an RA. Through this, the access point AP sets the NAV of a wireless communication terminal located in the wireless communication coverage of the access point AP.

The access point AP transmits a resource allocation frame for signaling a resource allocated to each of the first station STA1 and the second station STA2.

The first station STA1 and the second station STA2 obtain information on a resource allocated to the first station STA1 and the second station STA2 based on the resource allocation frame.

The first station STA1 and the second station STA2 transmit to the access point AP a CTS frame for notifying that the data is to be transmitted simultaneously. As described above, the transmitter address of the CTS frame may be a group address indicating a group including the first station STA2 and the second station STA2. In addition, the first station STA1 and the second station STA2 transmit the CTS frame to the access point AP using the same data rate and the same scramble seed. The first station STA1 sets the NAV of a wireless communication terminal located in the wireless coverage of the first station STA1 and the second station STA2 sets the NAV of a wireless communication terminal located in the wireless coverage of the second station STA2.

The first station STA1 and the second station STA2 transmit data to the access point AP through a resource allocated to each.

The access point AP receives data from the first station STA1 and the second station STA2 through the resources allocated to the first station STA1 and the second station STA2, respectively.

The access point AP transmits a multi-terminal ACK frame indicating completion of reception by the first station STA1 and the second station STA2. Specifically, the multi-terminal ACK frame may include a group address indicating a group including a first station STA1 and a second station STA2. Also, since the access point AP receives data through all the sub-frequency bands, the value of the 8-bit field indicating completion of reception of the multi-terminal ACK frame may be all 1 s.

Through such an operation, it is possible to reduce the time required for the first wireless communication terminal to transmit the transmission completion frame to a plurality of second wireless communication terminals.

Figure 21:
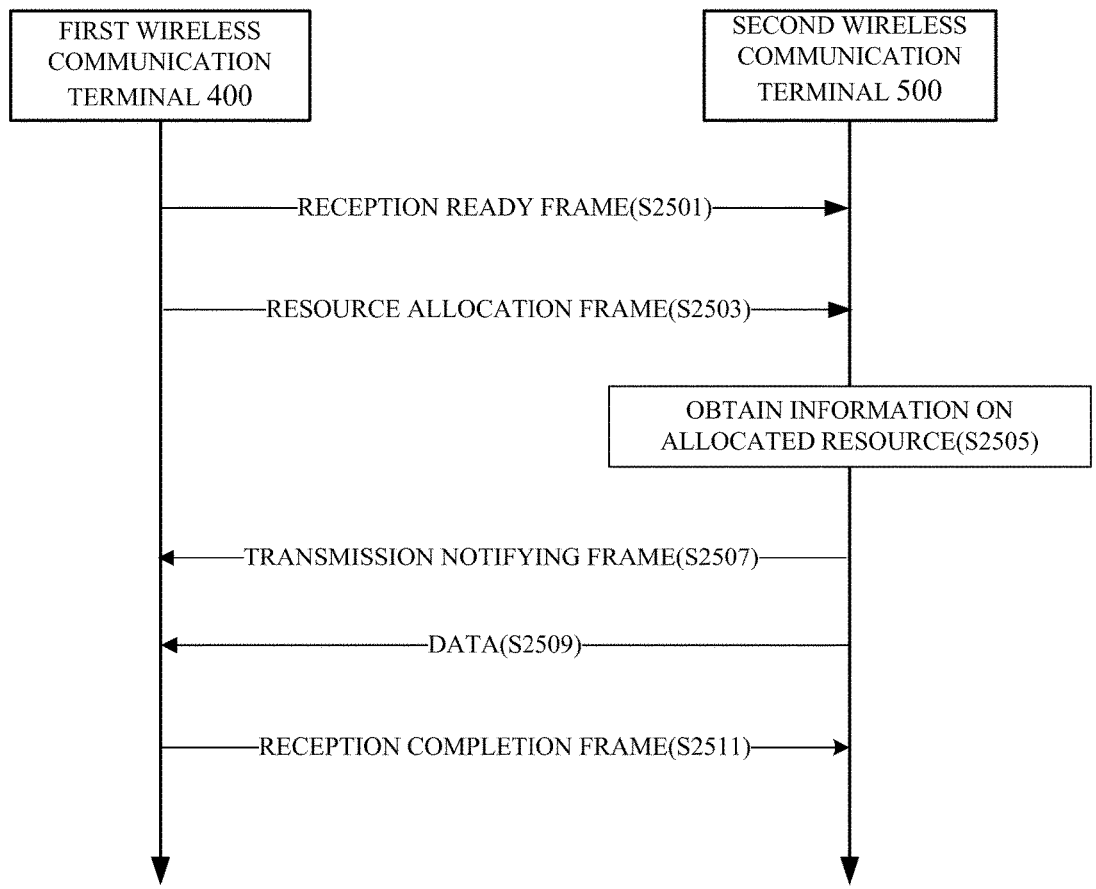
FIG. 21 is a ladder diagram illustrating operations of a first wireless communication terminal and a second wireless communication terminal according to an embodiment of the present invention.

FIG. 21 is a ladder diagram illustrating operations of a first wireless communication terminal and a second wireless communication terminal according to an embodiment of the present invention.

The first wireless communication terminal 400 transmits a reception ready frame indicating that it is ready to receive data to the second wireless communication terminal (S2501). The first wireless communication terminal 400 may transmit a reception ready frame to the plurality of second wireless communication terminals 500 through a contention-based access using a back-off. Specifically, when the channel is idle for a predetermined time, the first wireless communication terminal 400 may transmit a reception ready frame to the plurality of second wireless communication terminals 500. At this time, the predetermined time may be an arbitration inter-frame space (AIFS) or a DCF inter-frame space (DIFS) defined in the 802.11 standard.

The reception ready frame may follow the RTS frame format defined by the 802.11 standard. However, when the reception ready frame is in the RTS frame format, a wireless communication terminal included in the wireless communication coverage of the first wireless communication terminal but not included in the wireless communication coverage of the second wireless communication terminal may determine that the RTS frame is timeout before the ACK frame transmission time point of the first wireless communication terminal.

Therefore, the reception ready frame may follow the CTS frame format defined by the 802.11 standard. Especially, the reception ready frame may be a CTS frame whose Receiver Address (RA) is the address of the first wireless communication terminal that transmits the CTS frame. In addition, the RA of the reception ready frame may be a group address indicating a plurality of second wireless communication terminals.

The first wireless communication terminal 400 transmits a resource allocation frame indicating information on the resources allocated to the plurality of second wireless communication terminals 500 to the second wireless communication terminal (S2503). The first wireless communication terminal 400 may receive information on the channel state detected by each of the plurality of second wireless communication terminals 500 from each of the plurality of second wireless communication terminals 500. At this time, the first wireless communication terminal 400 may allocate a resource to each of the plurality of second wireless communication terminals 500 based on the information on the channel state detected by each of the plurality of second wireless communication terminals 500. Specifically, the first wireless communication terminal 400 may allocate a frequency band to each of the plurality of second wireless communication terminals 500 based on the information on the channel state detected by each of the plurality of second wireless communication terminals 500.

At this time, the second wireless communication terminal 500 may perform transmission using the orthogonal code as described above. The orthogonal code may be any one of a plurality of orthogonal codes. In another specific embodiment, the second wireless communication terminal 500 may use a fixed orthogonal code. Specifically, the fixed orthogonal code may be allocated to the second wireless communication terminal 500 when the first wireless communication terminal 400 and the second wireless communication terminal 500 are associated. In addition, the fixed orthogonal code may be re-allocated to the second wireless communication terminal 500 when the first wireless communication terminal 400 and the second wireless communication terminal 500 are associated again. At this time, the fixed orthogonal code may be obtained by calculating the identifier of the second wireless communication terminal 500 with the size and module of the orthogonal code set. At this time, the identifier of the second wireless communication terminal 500 may be an AID for identifying the association of the first wireless communication terminal 400 and the second wireless communication terminal 500.

The second wireless communication terminal 500 may transmit a signal modulated using the orthogonal code to the first wireless communication terminal 400 through all the channels detected as idle.

The second wireless communication terminal 500 may receive information on a channel to be detected by the first wireless communication terminal 400 and may detect a channel state based on information on the channel to be detected. At this time, the reception ready frame may signal information on a channel whose state is to be detected by the first wireless communication terminal 400. Specifically, the RA value of the reception ready frame may indicate information on a channel whose state is to be detected by the first wireless communication terminal.

In addition, the first wireless communication terminal 400 may transmit the resource allocation frame through the frequency band allocated to the second wireless communication terminal 500. At this time, if the frequency band allocated to each of the plurality of second wireless communication terminals 500 is smaller than the minimum unit frequency band, the first wireless communication terminal 400 may transmit the resource allocation frame to the second wireless communication terminal 500 through the frequency band having a frequency bandwidth smaller than the minimum unit frequency bandwidth. In a specific embodiment, the first wireless communication terminal 400 may transmit a resource allocation frame to the second wireless communication terminal 500 through a frequency band having a minimum frequency bandwidth allocable to the second wireless communication terminal 500. The minimum frequency bandwidth that the first wireless communication terminal 400 is able to allocate to the second wireless communication terminal 500 may be the smallest unit of the sub-carrier block.

As described above, the first wireless communication terminal 400 may signal information on resources allocated to each of the plurality of second wireless communication terminals 500 through a preamble of a physical frame including a resource allocation frame, a MAC header of a resource allocation frame, and a payload of a resource allocation frame.

In addition, the first wireless communication terminal 400 may transmit a reception ready frame and then transmit a resource allocation frame after a predetermined time. At this time, the predetermined time may be SIFS defined in the 802.11 standard.

In another specific embodiment, the first wireless communication terminal 400 may transmit a reception ready frame and transmit a resource allocation frame without a time interval. Specifically, the first wireless communication terminal 400 may transmit the reception ready frame immediately after the FCS field of the reception ready frame. At this time, the FCS field indicates whether the frame includes error data.

In another specific embodiment, the first wireless communication terminal may indicate that it is ready to receive data and may transmit an integrated frame for signaling resources allocated to each of the plurality of second wireless communication terminals. In a specific embodiment, the integrated frame may include information on resource allocation for each of the plurality of second wireless communication terminals 500 in the extension form of an MAC header. In another specific embodiment, the integrated frame may include information on resource allocation for each of the plurality of second wireless communication terminals 500 in the payload form of a frame. In another specific embodiment, the integrated frame may include information on resource allocation for each of the plurality of second wireless communication terminals 500 in the extension field form following the FCS field.

The second wireless communication terminal 500 obtains information on the allocated resource based on the resource allocation frame (S2505).

The second wireless communication terminal 500 transmits a transmission notifying frame for notifying the transmission of the second wireless communication terminal 500 to the first wireless communication terminal 400 (S2507). The transmission notifying frame sets the NAV of a wireless communication terminal located in the wireless communication coverage of the second wireless communication terminal 500.

The plurality of second wireless communication terminals 500 may transmit a transmission notifying frame to the first wireless communication terminal 400 at the same time. Specifically, the plurality of second wireless communication terminals 500 may simultaneously transmit the transmission notifying frame including the same format and the same contents. At this time, the transmission address of the transmission notifying frame may be a group address indicating a plurality of second wireless communication terminals 500.

In addition, the plurality of second wireless communication terminals 500 may simultaneously transmit the transmission notifying frame using the same data rate and scramble seed. Specifically, the plurality of second wireless communication terminals 500 may simultaneously transmit a transmission notifying frame based on an MCS or a data rate of a reception ready frame. In another specific embodiment, the plurality of second wireless communication terminals 500 may simultaneously transmit the transmission notifying frame based on the MCS or the data rate of the resource allocation frame. In such a case, even if the plurality of second wireless communication terminals simultaneously transmit the transmission notifying frame, collision does not occur between transmission notifying frames.

The transmission notifying frame may be in a format receivable by a legacy wireless communication terminal that does not support an embodiment of the present invention. Therefore, the second wireless communication terminal 500 may transmit the transmission notifying frame through the frequency band having the minimum unit frequency bandwidth. At this time, the minimum unit frequency bandwidth represents a minimum bandwidth used by the first wireless communication terminal 400. Specifically, the second wireless communication terminal 500 may have a frequency band allocated to the second wireless communication terminal 500 and transmit the transmission notifying frame through the frequency band having the minimum unit frequency band. In another specific embodiment, the second wireless communication terminal 500 may transmit a transmission notifying frame through a primary channel having a minimum unit frequency bandwidth. In a specific embodiment, the minimum unit frequency bandwidth may be 20 MHz.

In another specific embodiment, the second wireless communication terminal 500 may transmit a transmission notifying frame through a frequency band allocated to the second wireless communication terminal.

In a specific embodiment, the transmission notifying frame may be a CTS frame.

In addition, if there is a frequency band that does not receive the transmission notifying frame, the first wireless communication terminal 400 may reset the NAV set in the corresponding frequency band. Specifically, if there is a frequency band in which the transmission notifying frame is not received, the first wireless communication terminal 400 may transmit the NAV reset frame indicating that the NAV set in the frequency band in which the frame is transmitted through the corresponding frequency band. Specifically, if all of the second wireless communication terminals 500 to which sub-frequency bands included in any one frequency band (channel) are allocated, are not able to transmit the transmission notifying frame, the first wireless communication terminal 400 may transmit the NAV reset frame through the corresponding frequency band. At this time, the NAV reset frame may be a CF-END frame.

The second wireless communication terminal 500 transmits data to the first wireless communication terminal 400 through the resource allocated to the second wireless communication terminal 500 (S2509). Specifically, the second wireless communication terminal 500 may transmit data to the first wireless communication terminal 400 through the resource allocated to the second wireless communication terminal 500.

The first wireless communication terminal 400 transmits a reception completion frame indicating that the data is received from the plurality of second wireless communication terminals 500 to the second wireless communication terminal 500 (S2511).

As described above, the first wireless communication terminal 400 may receive data and transmit the reception completion frame to each of the plurality of second wireless communication terminals 500 that transmits the data. Specifically, the first wireless communication terminal 400 may transmit a reception completion frame to the second wireless communication terminal through a frequency band having a minimum frequency bandwidth allocated to the second wireless communication terminal 500. In a specific embodiment, the first wireless communication terminal 400 may transmit a reception completion frame to each of the plurality of second wireless communication terminals 500 for each frequency band allocated to each of the plurality of second wireless communication terminals 500 through OFDMA. At this time, the frequency band allocated to the second wireless communication terminal 500 may be the minimum frequency bandwidth that the first wireless communication terminal 400 is able to allocate to the second wireless communication terminal 500.

The minimum frequency bandwidth that the first wireless communication terminal 400 is able to allocate to the second wireless communication terminal 500 may be the smallest unit of the sub-carrier block.

In addition, the first wireless communication terminal 400 may transmit a reception completion frame for each minimum frequency bandwidth that the first wireless communication terminal 400 is able to allocate to the second wireless communication terminal 500. In such a case, the reception completion frame may indicate that data is received through the frequency band in which the reception completion frame is transmitted.

In such a case, the first wireless communication terminal 400 may transmit transmission completion frames to the plurality of wireless communication terminals at once. However, for compatibility with a legacy wireless communication terminal, the first wireless communication terminal may transmit the reception completion frame again through the frequency band having the minimum unit frequency bandwidth. At this time, the RA of the reception completion frame may be a group address indicating a plurality of second wireless communication terminals. In another specific embodiment, the RA of the reception completion frame may be the address of the first wireless communication terminal 400.

Also, the first wireless communication terminal 400 may transmit a reception completion frame only through a frequency band in which data is transmitted. The first wireless communication terminal 400 may not transmit a reception completion frame to a frequency-band in which data is not transmitted.

Also, the first wireless communication terminal 400 may transmit a multi-terminal reception completion frame indicating whether the data transmitted by the plurality of second wireless communication terminals 500 is received completely as a reception completion frame.

Specifically, the first wireless communication terminal 400 may simultaneously transmit a plurality of different multi-terminal reception completion frames for each minimum unit frequency bandwidth. In a specific embodiment, the first wireless communication terminal 400 may simultaneously transmit a plurality of multi-terminal reception completion frames through OFDMA. At this time, the first wireless communication terminal 400 may transmit a multi-terminal reception completion frame through a wireless frequency band allocated to the plurality of second wireless communication terminals 500 that are to receive the corresponding multi-terminal reception completion frame. For example, the first wireless communication terminal 400 may transmit the first multi-terminal reception completion frame and the second multi-terminal reception completion frame as one physical frame through OFDMA. At this time, the first wireless communication terminal 400 may transmit a first multi-terminal reception completion frame to the second wireless communication terminal 400 of the first group through the frequency band allocated to the second wireless communication terminal 500 of the first group. Here, the first group represents a plurality of second wireless communication terminals 500 that are to receive the first multi-terminal reception completion frame. In addition, the first wireless communication terminal 400 may transmit a second multi-terminal reception completion frame to the second wireless communication terminal 500 of the second group through the frequency band allocated to the second wireless communication terminal 500 of the second group. Here, the second group represents a plurality of second wireless communication terminals 500 that are to receive the second multi-terminal reception completion frame.

As described above, the first wireless communication terminal 400 may consider compatibility with a legacy wireless communication terminal that does not support an embodiment of the present invention when transmitting a reception completion frame. Accordingly, the multi-terminal reception completion frame may be the same as the transmission complete frame format supported by the legacy communication terminal. In addition, the first wireless communication terminal 400 may transmit a multi-terminal reception completion frame through a frequency band having a minimum unit frequency bandwidth.

The multi-terminal reception completion frame may include an identifier for identifying a plurality of second wireless communication terminals 500. At this time, the identifier for identifying the plurality of second wireless communication terminals 500 may be a group address indicating a group including a plurality of second wireless communication terminals 500. In a specific embodiment, the RA of the multi-terminal reception completion frame may be a group address indicating a group including a plurality of second wireless communication terminals 500.

The multi-terminal reception completion frame may indicate that there is data not received. Specifically, the multi-terminal reception completion frame may include a bit value indicating that there is data not received. In a specific embodiment, the multi-terminal reception completion frame may indicate that data transmitted by any one second wireless communication terminal 500 is not received. In another specific embodiment, the multi-terminal reception completion frame may indicate whether data reception is completed for each sub-frequency band of the frequency band in which the multi-terminal reception completion frame is transmitted. Specifically, a field value indicating the RA of the multi-terminal reception completion frame may indicate whether the data reception is completed for each sub-frequency band of the frequency band in which the multi-terminal reception completion frame is transmitted. For example, the address field of the multi-terminal reception completion frame may be a 6-byte field. At this time, a 5-byte field may be a group address indicating a group including a plurality of second wireless communication terminals. Each of the eight bits included in the remaining one byte may indicate whether data received through each sub-frequency band is received. For example, if the value of the bit is 1, it may indicate that the first wireless communication terminal 400 completely receives the data transmitted through the corresponding sub-frequency band. If the value of the bit is 0, it may indicate that the first wireless communication terminal 400 does not completely receive the data transmitted through the corresponding sub-frequency band. Accordingly, the first wireless communication terminal 400 sets the field value of the multi-terminal reception completion frame according to whether data is received or not. The second wireless communication terminal 500 determines whether the first wireless communication terminal receives the data based on the field value of the multi-terminal reception completion frame.

Although the present invention is described by using wireless LAN communication as an example, it is not limited thereto and may be applied to other communication systems such as cellular communication. Additionally, while the method, device, and system of the present invention are described in relation to specific embodiments thereof, some or all of the components or operations of the present invention may be implemented using a computer system having a general purpose hardware architecture.

The features, structures, and effects described in the above embodiments are included in at least one embodiment of the present invention and are not necessary limited to one embodiment. Furthermore, features, structures, and effects shown in each embodiment may be combined or modified in other embodiments by those skilled in the art. Therefore, it should be interpreted that contents relating to such combination and modification are included in the range of the present invention.

While the present invention is described mainly based on the above embodiments but is not limited thereto, it will be understood by those skilled in the art that various changes and modifications are made without departing from the spirit and scope of the present invention. For example, each component specifically shown in the embodiments may be modified and implemented. It should be interpreted that differences relating to such modifications and application are included in the scope of the present invention defined in the appended claims.

The invention claimed is:
1. A wireless communication terminal comprising:
a transceiver; and
a processor,
wherein the processor is configured to:
receive, by using the transceiver, a Medium Access Control (MAC) frame which triggers a simultaneous uplink transmission of a plurality of wireless communication terminals including the wireless communication terminal, from a base wireless communication terminal,
perform a clear channel assessment (CCA) in at least one of channels in response to receiving the MAC frame, and transmit, to the base wireless communication terminal, a response MAC frame for the MAC frame based on the CCA, when a predetermined time elapses after receiving operation of the MAC frame,
wherein the predetermined time has a value which is applied in the simultaneous uplink transmission of the plurality of wireless communication terminals.

2. The wireless communication terminal of claim 1, wherein the processor is configured to determine whether a channel state is in an idle state according to the CCA,
wherein the response MAC frame represents whether the channel state is in an idle state.

3. The wireless communication terminal of claim 2, wherein the processor is configured to determine whether the channel state is in an idle state in unit of 20 MHz.

4. The wireless communication terminal of claim 1, wherein the at least one of channels includes a secondary channel.

5. The wireless communication terminal of claim 1, wherein the MAC frame includes information on a channel in which the CCA to be performed,
wherein the processor is configured to perform the CCA in the at least one of channels according to the information.

6. The wireless communication terminal of claim 1, wherein the predetermined time is SIFS(short inter-frame space).

7. The wireless communication terminal of claim 1, wherein the processor is configured to transmit, to the base wireless communication terminal, the response MAC frame by using an orthogonal code.

8. The wireless communication terminal of claim 7, wherein the orthogonal code is one arbitrarily selected from a plurality of orthogonal codes.

9. The wireless communication terminal of claim 7, wherein the orthogonal code is determined based on an AID(Association Identifier) of the wireless communication terminal.

10. A base wireless communication terminal comprising:
a transceiver; and
a processor,
wherein the processor is configured to:
transmit, by using the transceiver, a Medium Access Control (MAC) frame which triggers a simultaneous uplink transmission of a plurality of wireless communication terminals, to the plurality of wireless communication terminals, and
receive at least one response MAC frame for the MAC frame from at least one of the plurality of wireless communication terminals, when a predetermined time elapses after transmitting the MAC frame, wherein the predetermined time has a value which is applied in the simultaneous uplink transmission of the plurality of wireless communication terminals,
wherein the at least one response MAC frame is transmitted based on a clear channel assessment (CCA) which is performed by each of the plurality of wireless communication terminals.

11. The base wireless communication terminal of claim 10, wherein the at least one response MAC frame represents whether a channel state is in an idle state, which is determined by the CCA.

12. The base wireless communication terminal of claim 11, wherein the information on whether the channel state is in an idle state is determined in unit of 20 MHz.

13. The base wireless communication terminal of claim 10, wherein the at least one of the plurality of the wireless communication terminal performs CCA in a secondary channel based on the MAC frame.

14. The base wireless communication terminal of claim 10, wherein the processor is configured to insert information on a channel in which the CCA to be performed into the MAC frame.

15. The base wireless communication terminal of claim 10, wherein the predetermined time is the SIFS(short inter-frame space).

16. The base wireless communication terminal of claim 10, wherein the processor is configured to receive the at least one of the response MAC frame by using an orthogonal code.

17. The base wireless communication terminal of claim 16, wherein the orthogonal code is one arbitrarily selected from a plurality of orthogonal codes by each of the plurality of the wireless communication terminal.

18. The base wireless communication terminal of claim 16, wherein the orthogonal code is determined based on an AID(Association Identifier) of each of the plurality of the wireless communication terminal.

19. An operating method of a wireless communication terminal comprising:
receiving a Medium Access Control (MAC) frame which triggers a simultaneous uplink transmission of a plurality of wireless communication terminals including the wireless communication terminal, from a base wireless communication terminal,
performing a clear channel assessment (CCA) in at least one of channels in response to receiving the MAC frame, and
transmitting, to the base wireless communication terminal, a response MAC frame for the MAC frame based on the CCA, when a predetermined time elapses after receiving operation of the MAC frame,
wherein the predetermined time has a value which is applied in the simultaneous uplink transmission of the plurality of wireless communication terminals.

* * * * *